United States Patent
Yamauchi et al.

(10) Patent No.: US 9,493,625 B2
(45) Date of Patent: Nov. 15, 2016

(54) THERMALLY EXPANDING MICROCAPSULES

(71) Applicants: SEKISUI CHEMICAL CO., LTD., Osaka (JP); TOKUYAMA SEKISUI CO., LTD., Osaka (JP)

(72) Inventors: Hiroshi Yamauchi, Osaka (JP); Hiroyuki Morita, Osaka (JP); Satoshi Haneda, Osaka (JP); Yasuko Wada, Yamaguchi (JP)

(73) Assignees: SEKISUI CHEMICAL CO., LTD., Osaka (JP); TOKUYAMA SEKISUI CO., LTD., Osaka (JP)

( * ) Notice: Subject to any disclaimer, the term of this patent is extended or adjusted under 35 U.S.C. 154(b) by 0 days.

(21) Appl. No.: 14/764,755

(22) PCT Filed: Sep. 22, 2014

(86) PCT No.: PCT/JP2014/074992
§ 371 (c)(1),
(2) Date: Jul. 30, 2015

(87) PCT Pub. No.: WO2015/046094
PCT Pub. Date: Apr. 2, 2015

(65) Prior Publication Data
US 2015/0368423 A1   Dec. 24, 2015

(30) Foreign Application Priority Data

Sep. 26, 2013   (JP) ................................ 2013-200204
Feb. 21, 2014   (JP) ................................ 2014-032102
Mar. 27, 2014   (JP) ................................ 2014-066531

(51) Int. Cl.
*C08J 9/16*   (2006.01)
*C08J 9/32*   (2006.01)
*B01J 13/14*   (2006.01)

(52) U.S. Cl.
CPC   *C08J 9/16* (2013.01); *B01J 13/14* (2013.01); *C08J 9/32* (2013.01); *C08J 2201/024* (2013.01); *C08J 2203/22* (2013.01); *C08J 2300/22* (2013.01); *C08J 2300/26* (2013.01); *C08J 2333/14* (2013.01)

(58) Field of Classification Search
CPC .............. B01J 13/14; C08J 9/16; C08J 9/32; C08J 2201/024; C08J 2203/22; C08J 2300/22; C08J 2300/26; C08J 2333/14
See application file for complete search history.

(56) References Cited

U.S. PATENT DOCUMENTS

| 6,235,394 B1 | 5/2001 | Shimazawa et al. |
| 2011/0263746 A1 | 10/2011 | Kawaguchi et al. |
| 2013/0065975 A1* | 3/2013 | Natsui ..................... B01J 13/14 521/57 |
| 2013/0303639 A1* | 11/2013 | Yamauchi .................. C08J 9/32 521/59 |

FOREIGN PATENT DOCUMENTS

| GB | 1044680 | 12/1963 |
| GB | 1093804 | 12/1967 |
| JP | 42-26524 | 12/1967 |
| JP | 2005-272633 | 10/2005 |
| JP | 2009-221429 | 10/2009 |
| JP | 2010-229341 | 10/2010 |
| JP | 2011-68825 | 4/2011 |
| JP | 2013-212433 | 10/2013 |
| KR | 10-2013-0079357 | 7/2013 |
| WO | 99/43758 | 9/1999 |
| WO | 2010/052972 | 5/2010 |
| WO | WO2012091098 | * 7/2012 |

OTHER PUBLICATIONS

International Search Report issued Jan. 6, 2015 in International (PCT) Application No. PCT/JP2014/074992.
Written Opinion of the International Searching Authority issued Jan. 6, 2015 in International (PCT) Application No. PCT/JP2014/074992.

* cited by examiner

*Primary Examiner* — Irina S Zemel
(74) *Attorney, Agent, or Firm* — Wenderoth, Lind & Ponack, L.L.P.

(57) ABSTRACT

The present invention provides a thermally expandable microcapsule that has a high expansion ratio and durability at high temperatures, and is not likely to cause discoloration and odor when used for foam molding. The thermally expandable microcapsule of the present invention includes: a shell formed from a polymer; and a volatile expansion agent as a core agent encapsulated by the shell, the shell obtained by polymerizing a monomer composition that contains a nitrile monomer and a compound having a glycidyl group in a molecule, the shell exhibiting a value y of 50% or higher and a ratio y/x of 1.1 or higher, in which x represents a gel fraction at ordinary temperature, and y represents a gel fraction upon heating at 180° C. for 30 minutes.

12 Claims, No Drawings

THERMALLY EXPANDING MICROCAPSULES

TECHNICAL FIELD

The present invention relates to a thermally expandable microcapsule that has a high expansion ratio and durability at high temperatures, and is not likely to cause discoloration and odor when used for foam molding.

BACKGROUND ART

Thermally expandable microcapsules are used as design-imparting agents and weight-reducing agents in various applications. They have also been used for paint, such as foaming ink and wallpaper, to achieve weight reduction.

A widely known thermally expandable microcapsule is one which includes a thermoplastic shell polymer filled with a volatile expansion agent which turns into gas at a temperature not higher than the softening point of the shell polymer. For example, Patent Literature 1 discloses a method for producing a thermally expandable microcapsule filled with a volatile expansion agent, including the steps of: preparing an oily mixture by mixing a monomer and a volatile expansion agent such as an aliphatic hydrocarbon having a low boiling point; and adding the oily mixture and an oil-soluble polymerization catalyst to an aqueous dispersion medium containing a dispersant with stirring to perform suspension polymerization.

The thermally expandable microcapsule obtained by the method can be thermally expanded by gasification of the volatile expansion agent at relatively low temperatures of about 80° C. to 130° C. When the microcapsule is heated at high temperatures or for a long time, however, gas escapes from the expanded microcapsule, leading to reduction in the expansion ratio. Also, insufficient thermal resistance and strength of the thermally expandable microcapsule may cause a phenomenon called "deflation" to break the microcapsule at high temperatures.

Patent Literature 2 discloses a thermally expandable microcapsule which includes as a shell a polymer obtainable by polymerizing a carboxy group-containing monomer and a monomer having a group reactive with carboxy groups. Patent Literature 2 teaches that such a thermally expandable microcapsule has an increased three-dimensional cross-linking density, and is therefore extremely resistant to contraction even after the shell is expanded to be very thin. Patent Literature 2 also teaches that such a thermally expandable microcapsule has significantly improved heat resistance.

However, formation of strong three-dimensional cross-links during polymerization inhibits expansion in foaming, and thus the resulting expansion ratio is yet insufficient.

CITATION LIST

Patent Literature

Patent Literature 1: JP S42-26524 B
Patent Literature 2: WO 99/43758

SUMMARY OF INVENTION

Technical Problem

An object of the present invention is to provide a thermally expandable microcapsule that has a high expansion ratio and durability at high temperatures, and is not likely to cause discoloration and odor when used for foam molding.

Solution to Problem

The present invention relates to a thermally expandable microcapsule including: a shell formed from a polymer, and a volatile expansion agent as a core agent encapsulated by the shell, the shell obtained by polymerizing a monomer composition that contains a nitrile monomer and a compound having a glycidyl group in a molecule, the shell exhibiting a value y of 50% or higher and a ratio y/x of 1.1 or higher, in which x represents a gel fraction at ordinary temperature, and y represents a gel fraction upon heating at 180° C. for 30 minutes.

Hereinafter, the present invention is described in detail.

The present inventors have made a thermally expandable microcapsule obtained through polymerization of a monomer composition containing a nitrile monomer in the presence of a compound containing a glycidyl group in a molecule, so that the thermally expandable microcapsule has a gel fraction at ordinary temperature, a gel fraction upon heating at 180° C. for 30 minutes, and a ratio of these gel fractions within the respective predetermined ranges. The present inventors have found that such a thermally expandable microcapsule achieves high gas barrier properties of the shell even at around the foaming starting temperature, has favorable thermal expansion properties, and is not likely to be deflated to have excellent durability due to high rigidity of the shell at around the maximum foaming temperature. Thereby, the present invention has been completed.

The shell formed from a polymer exhibits a value y of 50% or higher and a ratio y/x of 1.1 or higher, in which x represents a gel fraction at ordinary temperature, and y represents a gel fraction upon heating at 180° C. for 30 minutes.

If the value y is 50% or higher, the risk of contraction and burst of the expanded shell is low, and thus favorable heat resistance and durability are achieved. If the ratio y/x is 1.1 or higher, the shell which is flexible at ordinary temperature to around the expansion starting temperature exhibits a high expansion ratio, and thus the expanded shell has high strength, so that favorable heat resistance and durability are achieved.

Here, the value y is preferably 60 to 90%, and the ratio y/x is preferably 1.2 to 5.0.

Preferably, the polymer constituting the shell has a degree (A) of cross-linkage upon heating at 140° C. for 30 minutes of 50% by weight or higher. If the degree (A) of cross-linkage is 50% by weight or higher, the meshes of the shell are not likely to be widened when the foaming is started, which prevents the volatile expansion agent from being released out of the shell. Accordingly, a favorable expansion ratio can be achieved. Also, favorable heat-resistance can be achieved.

The degree (A) of cross-linkage is more preferably 55 to 74% by weight, and still more preferably 72 to 74% by weight. If the degree is in such a range, the constant temperature retention properties at 200° C. over 30 minutes, heat resistance, and durability can be improved.

The degree of cross-linkage is a weight ratio (% by weight) of the weight of undissolved substances of the polymer constituting the shell of the thermally expandable microcapsule in a mixture with a solvent, to the weight of the shell of the thermally expandable microcapsule before heating. The solvent here is N,N-dimethylformamide which is a solvent that dissolves the polymer constituting the shell.

Also, the "degree of cross-linkage upon heating at 140° C. for 30 minutes" is the degree of cross-linkage after heating at a constant temperature of 140° C. for 30 minutes.

The polymer constituting the shell preferably has a degree (B) of cross-linkage upon heating at 210° C. for 30 minutes of 75% by weight or higher. If the degree (B) of cross-linkage is 75% by weight or higher, it is possible to suppress occurrence of deflation of the thermally expandable microcapsule when the thermally expandable microcapsule is thermally expanded to the maximum. The degree (B) of cross-linkage is more preferably 85 to 100% by weight.

The polymer constituting the shell preferably has a ratio (B/A) of (B) to (A) of 1.2 to 1.8.

If the ratio (B/A) is 1.2 or higher, the shell can be sufficiently cross-linked, and the thermally expandable microcapsule is less likely to be deflated. If the ratio (B/A) is 1.8 or lower, the shell does not have excessively high hardness, which gives sufficient thermal expansion properties to the thermally expandable microcapsule.

The lower limit of the ratio (B/A) is more preferably 1.3, and the upper limit thereof is more preferably 1.6.

The difference (B−A) of the degree (B) of cross-linkage from the degree (A) of cross-linkage is preferably 5 to 50% by weight.

If the difference (B−A) is 5% by weight or more, occurrence of deflation of the thermally expandable microcapsule can be suppressed, and sufficient constant temperature retention properties at 200° C. over 30 minutes can be achieved. If the difference (B−A) is 50% by weight or less, the expansion ratio can be sufficiently increased. The difference (B−A) is more preferably 18 to 40% by weight, and still more preferably 22 to 35% by weight. If the difference is 20 to 24% by weight, heat resistance and durability can be achieved as well as constant temperature retention properties at 200° C. over 30 minutes.

The polymer constituting the shell preferably generates heat at 140° C. to 210° C. in a differential scanning calorimetry curve. The above temperature range in which the shell of the thermally expandable microcapsule generates heat due to curing overlaps the maximum foaming temperature range of the thermally expandable microcapsule, and thus the thermally expandable microcapsule is not likely to be deflated.

Here, "generating heat at 140° C. to 210° C. in a differential scanning calorimetry curve" means that in the differential scanning calorimetry curve, if the amount of generated heat at 140° C. is taken as a start point and the amount of generated heat at 210° C. is taken as an end point, the curve shows an inflection point that forms a convex over a straight line formed by connecting the start point and the end point. The temperature at the inflection point at which the maximum amount of heat is generated is also referred to as the heat generation temperature of the differential scanning calorimetry curve.

The polymer constituting the shell in the present invention preferably generates heat particularly at 150° C. to 210° C. in the differential scanning calorimetry curve.

In the thermally expandable microcapsule of the present invention, the polymer constituting the shell has a storage elastic modulus (X) at a temperature of 140° C. and a frequency of 10 Hz of from a lower limit of preferably $1\times10^6$ Pa to an upper limit of preferably $1\times10^7$ Pa. If the storage elastic modulus (X) is $1\times10^6$ Pa or higher, the flexibility of the shell can be maintained, and thus more favorable thermal expansion can be achieved.

If the storage elastic modulus (X) is lower than $1\times10^6$ Pa, the meshes of the shell are likely to be widened when the thermal expansion is started, which allows the volatile expansion agent to be released out of the shell. Accordingly, it may be difficult to increase the expansion ratio. Here, the heat resistance may also decrease. If the storage elastic modulus (X) is higher than $1\times10^7$ Pa, elongation of the shell is low, and it may be difficult to increase the thermal expansion ratio. The lower limit of the storage elastic modulus (X) is more preferably $4.5\times10^6$ Pa, and the upper limit thereof is more preferably $6.0\times10^6$ Pa.

In the thermally expandable microcapsule of the present invention, the polymer constituting the shell has a storage elastic modulus (Y) at a temperature of 210° C. and a frequency of 10 Hz of from a lower limit of preferably $1\times10^8$ Pa to an upper limit of preferably $1\times10^9$ Pa. If the storage elastic modulus (Y) is $1\times10^8$ Pa or higher, the hardness of the shell is made high to suppress breakage of the shell by shearing from melt kneading in molding, so that a stable molded product can be obtained.

If the storage elastic modulus (Y) is $1\times10^8$ Pa or higher, sufficient durability can be achieved. Also, favorable low-temperature retention properties can be achieved. If the storage elastic modulus (X) is $1\times10^9$ Pa or lower, the shell is not excessively hard, and the strength of the shell can be sufficient. The lower limit of the storage elastic modulus (X) is more preferably $1.3\times10^8$ Pa, and the upper limit thereof is more preferably $5.5\times10^8$ Pa.

The storage elastic moduli (X) and (Y) of the shell at a temperature of 140° C. or 210° C. and a frequency 10 Hz can be measured by the tensile method with a dynamic viscoelasticity measurement device using sheet-shaped specimens obtained from only the shell of the thermally expandable microcapsule of the present invention.

In the thermally expandable microcapsule of the present invention, the lower limit of the ratio (Y/X) of the storage elastic modulus (X) of the polymer constituting the shell at 140° C. and 10 Hz to the storage elastic modulus (Y) of the polymer constituting the shell at 210° C. and 10 Hz is preferably 100, and the upper limit thereof is preferably 1,500. If the ratio (Y/X) is 100 or higher, the constant temperature retention properties and heat resistance can be made favorable, and if the ratio is 1,500 or lower, the constant temperature retention properties and compression resistance can be made favorable.

The lower limit of the ratio (Y/X) is more preferably 120, while the upper limit of the ratio is more preferably 1,000, and still more preferably 500.

The thermally expandable microcapsule of the present invention includes a volatile expansion agent as a core agent encapsulated by the shell formed from a polymer. With the thermally expandable microcapsule of the present invention having such a structure, it is possible to produce a product such as a foaming mold by, for example, mixing the microcapsule into a matrix resin and molding the mixture such that the heating in the molding causes the core agent to be gaseous and softens the shell to expand the shell.

The monomer composition for forming the polymer contains a nitrile monomer. When the monomer composition contains the nitrile monomer, the resulting thermally expandable microcapsule has high heat resistance and high gas barrier properties.

Nonlimiting examples of the nitrile monomer include acrylonitrile, methacrylonitrile, α-chloroacrylonitrile, α-ethoxyacrylonitrile, fumaronitrile, and mixtures thereof. In particular, acrylonitrile and methacrylonitrile are preferred. These may be used alone or in combination.

For each 100 parts by weight of the whole monomer components, the lower limit of an amount of the nitrile monomer in the monomer composition is preferably 50 parts by weight, and the upper limit is preferably 99 parts by weight. If the amount of the nitrile monomer is 50 parts by weight or more, the gas barrier properties can be made favorable, and the expansion ratio can be made sufficient. If the amount of the nitrile monomer is 99 parts by weight or less, the monomer composition can sufficiently contain the other components, and thus can provide the effect of bonding of the carboxylic groups or amide groups with glycidyl groups in foaming by heating.

The lower limit is more preferably 60 parts by weight, and the upper limit is more preferably 95 parts by weight.

The monomer composition for forming the polymer contains a compound containing a glycidyl group in a molecule.

The compound containing a glycidyl group in a molecule is cured when the thermally expandable microcapsule is foamed by heat, not when the monomer composition is polymerized. For this reason, the expansion ratio can be increased without inhibition of expansion in foaming.

Here, the compound containing a glycidyl group in a molecule may serve as a monomer that constitutes the polymer of the shell, or may be contained in the shell without constituting the polymer.

The compound containing a glycidyl group in a molecule is preferably one that contains at least one polymerizable unsaturated bond in a molecule. When the compound contains at least one polymerizable unsaturated bond in a molecule, incorporation of the polymerizable groups into the main chain of the shell polymer leads to higher curability of the thermally expandable microcapsule in foaming by heating, which allows a great increase in the heat resistance and durability.

The compound containing a glycidyl group in a molecule also preferably contains at least two glycidyl groups in a molecule. When the compound contains at least two glycidyl groups in a molecule, the curability can be further increased. In particular, the heat from foaming by heating more firmly bonds carboxyl groups and amide groups with glycidyl groups, and thereby the heat resistance and the curability are greatly increased.

Examples of the compound containing a glycidyl group in a molecule include glycidyl group-containing monomers and epoxy resins.

The glycidyl group-containing monomers refer to monomers containing a glycidyl group and a radical polymerizable double bond.

Also, the epoxy resins are compounds that have at least two oxirane rings (epoxy groups) in a molecule, and no radical polymerizable double bond.

Examples of the glycidyl group-containing monomer include epoxy (meth)acrylates. Examples of the epoxy (meth)acrylates include glycidyl methacrylate, glycidyl acrylate, allyl glycidyl ether, 4-hydroxybutyl acrylate glycidyl ether, phenol-type epoxy diacrylate, allyl alcohol-type epoxy diacrylate, 1,6-hexanediol-type epoxy diacrylate, bisphenol-type epoxy diacrylate, phthalic acid-type epoxy diacrylate, polypropylene glycol-type epoxy diacrylate (n=1, 3, 11), and polyethylene glycol-type epoxy dimethacrylate (n=1, 2, 9).

Examples of the epoxy resins include bisphenol A-type epoxy resin (jER-828: produced by Mitsubishi Chemical Corporation), hydrogenated bisphenol A-type epoxy resin (YX-8000: produced by Mitsubishi Chemical Corporation), bisphenol F-type epoxy resin (jER-807: produced by Mitsubishi Chemical Corporation), phenol novolak-type epoxy resin (jER-152: produced by Mitsubishi Chemical Corporation), cresol novolak-type epoxy resin (N-660: produced by DIC Corporation), biphenyl-type epoxy resin (YX-4000: produced by Mitsubishi Chemical Corporation), dicyclopentadiene-type epoxy resin (HP-7200L: produced by DIC Corporation), and aminophenol-type epoxy resin (jER-630: produced by Mitsubishi Chemical Corporation).

Also, ethylene glycol diglycidyl ether, diethylene glycol diglycidyl ether, 1,6-hexanediol diglycidyl ether, 1,4-butanediol diglycidyl ether, cyclohexane dimethanol diglycidyl ether, triethylene glycol diglycidyl ether, polyethylene glycol diglycidyl ether, propylene glycol diglycidyl ether, polypropylene glycol diglycidyl ether, neopentyl glycol diglycidyl ether, and trimethylolpropane polyglycidyl ether may be used.

The number of repeating oxyethylene units of the polyethylene glycol diglycidyl ether is not particularly limited. For example, polyethylene glycol diglycidyl ether with the number of repeating oxyethylene units of 2, 4, 9, 13, or 23 (n=2, 4, 9, 13, or 23) can be used. The number of repeating oxypropylene units of polypropylene glycol diglycidyl ether is not particularly limited. For example, a polypropylene glycol diglycidyl ether with the number of repeating oxypropylene units of 2, 3, or 11 (n=2, 3, or 11) can be used.

Also, a compound containing at least two glycidyl ether structures in a molecule may be used.

Examples of the compound containing at least two glycidyl ether structures in a molecule include polyglycidyl ethers of a compound having 0 to 1 mol of epichlorohydrin added thereto per mole of glycerol and mixtures thereof, and polyglycidyl ethers of a compound having 0 to 2 mol of epichlorohydrin added thereto per mole of ethylene glycol and mixtures thereof.

The lower limit of the amount of the compound containing a glycidyl group in a molecule in the monomer composition is preferably 0.1% by weight of the whole monomer composition, and the upper limit thereof is preferably 20% by weight of the whole monomer composition.

If the amount of the compound containing a glycidyl group in a molecule is 0.1% by weight or more, favorable heat curability can be achieved in foaming by heating. If the amount of the compound containing a glycidyl group in a molecule is 20% by weight or less, the gas barrier properties of the shell does not decrease, and thus inhibition of foaming can be suppressed. The lower limit is more preferably 0.5% by weight, and the upper limit is more preferably 10% by weight.

The monomer composition preferably contains a hydroxy group-containing monomer having a radical polymerizable double bond and a hydroxy group, as well as the above nitrile monomer.

When the composition contains the hydroxy group-containing monomer, the hydroxy group and the later-described polyfunctional reactive compound in the resulting thermally expandable microcapsule are bonded by the heat from foaming by heating. Thereby, the heat resistance and durability can be further increased.

Examples of the hydroxy group-containing monomer include 2-hydroxyethyl (meth)acrylate, 2-hydroxybutyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)methyl acrylate, vinyl alcohol, allyl alcohol, 2-hydroxyethyl vinyl ether, 4-hydroxybutyl vinyl ether, diethylene glycol monovinyl ether, pentaerythritol tri(meth)acrylate, pentaerythritol di(meth)acrylate monostearate, isocyanuric acid ethyleneoxide-modified di(meth)acrylate, 2-hydroxy-3-phenoxypropyl (meth)acrylate, glycerol (meth)acrylate, and 2-hydroxy-3-(meth)acryloyloxy propyl (meth)acrylate.

In particular, hydroxy group-containing alkyl (meth)acrylates are preferred. Also, hydroxy group-containing monomers with one radical polymerizable double bond are preferred. Particularly preferred are 2-hydroxyethyl (meth) acrylate and 2-hydroxybutyl methacrylate.

The lower limit of the amount of the hydroxy group-containing monomer in the monomer composition is preferably 0.1 parts by weight, and the upper limit thereof is preferably 20 parts by weight, for each 100 parts by weight of the whole monomer components. If the amount of the hydroxy group-containing monomer is 0.1 parts by weight or more, the effect of bonding of the monomer with a polyfunctional reactive compound in foaming by heating can be sufficient. If the amount is 20 parts by weight or less, the gas barrier properties of the shell is not inhibited, and thus a sufficient expansion ratio can be achieved.

The lower limit is more preferably 1 part by weight, and the upper limit is more preferably 10 parts by weight.

If the monomer composition contains a hydroxy group-containing monomer, the compound containing a glycidyl group in a molecule is preferably a polyfunctional reactive compound that contains at least two glycidyl groups in one molecule and no radical polymerizable double bond.

The polyfunctional reactive compound is preferably an epoxy resin such as bisphenol A-type epoxy resin, bisphenol F-type epoxy resin, phenol novolak-type epoxy resin, cresol novolak-type epoxy resin, dicyclopentadiene-type epoxy resin, glycidyl amine-type epoxy resin, or aminophenol-type epoxy resin.

The ratio between the polyfunctional reactive compound and the hydroxy group-containing monomer is preferably 1 time or more (hydroxy group-containing monomer/polyfunctional reactive compound ≥1). If the ratio is in the above range, unreacted sites of the polyfunctional reactive compound are reduced, and the curability can be achieved.

The combination of the polyfunctional reactive compound and the hydroxy group-containing monomer is particularly preferably a combination of an epoxy resin and a compound selected from 2-hydroxyethyl (meth)acrylate, 2-hydroxybutyl (meth)acrylate, 2-hydroxypropyl (meth) acrylate, and 3-hydroxypropyl (meth)acrylate.

The monomer composition for forming the polymer preferably contains an amide group-containing monomer. When the monomer composition contains the amide group-containing monomer, the amide group and the above compound containing a glycidyl group in a molecule in the resulting thermally expandable microcapsule are bonded by the heat from foaming by heating, and thus the heat resistance and durability can be further increased.

Examples of the amide group-containing monomer include (meth)acrylamides, N-substituted (meth)acrylamides, N,N-substituted (meth)acrylamides, and N-vinylamides.

Examples of the (meth)acrylamides include acrylamide and methacrylamide.

Examples of the N-substituted (meth)acrylamides include N-methylol acrylamide, N-methylol methacrylamide, N-methoxymethyl acrylamide, N-isopropoxymethyl acrylamide, N-butoxymethyl acrylamide, N-isobutoxymethyl acrylamide, N-octyloxymethyl acrylamide, N-carboxymethyleneoxymethyl acrylamide, and isopropylacrylamide.

Examples of the N,N-substituted (meth)acrylamides include dimethylacrylamide, diethylacrylamide, and dimethylaminopropylacrylamide.

Examples of the N-vinylamides include N-vinylacetamide.

When the amide group-containing monomer is an N-substituted (meth)acrylamide or an N,N-substituted (meth)acrylamide, the carbon number of substituents on nitrogen is preferably 1 to 4, and more preferably 1 or 2.

Particularly preferred among the amide group-containing monomers are acrylamide and methacrylamide, from the viewpoints of high heat resistance and high gas barrier properties.

The lower limit of the amount of the amide group-containing monomer in the monomer composition is preferably 0.9% by weight, and the upper limit thereof is preferably 20% by weight, for each 100% by weight of the whole monomer composition.

If the amount of the amide group-containing monomer is 0.9% by weight or more, the effect of bonding of the monomer with the above compound containing a glycidyl group in a molecule in foaming by heating can be more favorably achieved. If the amount of the amide group-containing monomer is 20% by weight or less, induction of particle aggregation in polymerization can be suppressed. The lower limit is more preferably 2% by weight and the upper limit is more preferably 18% by weight. The lower limit is particularly preferably 3% by weight, and the upper limit is particularly preferably 15% by weight.

The lower limit of the ratio of the amide group-containing monomer to the compound containing a glycidyl group in a molecule (amide group-containing monomer/compound containing a glycidyl group in a molecule) is preferably 1.5, and the upper limit thereof is preferably 12.

If the ratio of the amide group-containing monomer to the compound containing a glycidyl group in a molecule is in the above range, the effect of bonding with the compound containing a glycidyl group in a molecule in foaming by heating can be more favorable.

The monomer composition preferably further contains a cross-linkable monomer that has at least two double bonds in a molecule. The cross-linkable monomer functions as a cross-linking agent. When the monomer composition contains the cross-linkable monomer, the strength of the shell can be enhanced, and the cell wall is less likely to be broken upon heat expansion. The cross-linkable monomer containing at least two double bonds in a molecule does not contain the compound containing a glycidyl group in a molecule.

Examples of the cross-linkable monomer include monomers containing at least two radical polymerizable double bonds. Specific examples thereof include divinylbenzene, ethylene glycol di(meth)acrylate, diethylene glycol di(meth) acrylate, triethylene glycol di(meth)acrylate, propylene glycol di(meth)acrylate, 1,4-butanediol di(meth)acrylate, 1,6-hexanediol di(meth)acrylate, 1,9-nonanediol di(meth) acrylate, di(meth)acrylates of a polyethylene glycol having a weight average molecular weight of 200 to 600, glycerol di(meth)acrylate, trimethylolpropane di(meth)acrylate, trimethylolpropane tri(meth)acrylate, ethylene oxide-modified trimethylolpropane tri(meth)acrylate, pentaerythritol tri (meth)acrylate, triallylformal tri(meth)acrylate, pentaerythritol tetra(meth)acrylate, dipentaerythritol hexa(meth)acrylate, dimethylol-tricyclodecane di(meth)acrylate. Suitable among these are trifunctional monomers such as trimethylolpropane tri(meth)acrylate and bifunctional (meth)acrylates such as polyethylene glycol. This is because such a monomer enables comparatively uniform cross-linking to a shell mainly containing acrylonitrile, and the thermally expanded microcapsule is less likely to shrink at high temperatures of over 200° C. and is likely to maintain the expanded state, so that the phenomenon called "deflation" can be suppressed.

The lower limit of the amount of the cross-linkable monomer in the monomer composition is preferably 0.1% by weight, and the upper limit thereof is preferably 3.0% by weight.

If the amount of the cross-linkable monomer is 0.1% by weight or more, the effect as a cross-linking agent can be sufficiently achieved. If the amount is 3.0% by weight or less, the expansion ratio of the thermally expandable microcapsule can be made favorable. The lower limit of the amount of the cross-linkable monomer is more preferably 0.15% by weight, and the upper limit thereof is more preferably 2.0% by weight.

As well as the nitrile monomer, the hydroxy group-containing monomer, the amide group-containing monomer, the compound containing a glycidyl group in a molecule, and cross-linkable monomer, the monomer composition may contain any other monomer copolymerizable with the nitrile monomer (hereinafter, also referred to simply as any other monomer).

The any other monomer is not particularly limited, and may be appropriately selected depending on the properties required for the resulting thermally expandable microcapsule. Examples thereof include acrylic acid esters such as methyl acrylate, ethyl acrylate, butyl acrylate, and dicyclopentenyl acrylate; methacrylic acid esters such as methyl methacrylate, ethyl methacrylate, butyl methacrylate, and isobornyl methacrylate; and vinyl monomers such as vinyl chloride, vinylidene chloride, vinyl acetate, and styrene.

These may be used alone or in combination.

If the monomer composition contains the any other monomer, the amount of the any other monomer in the monomer composition is not particularly limited, but the upper limit thereof for each 100% by weight of the whole monomer composition is preferably 40% by weight.

If the amount of the any other monomer is 40% by weight or less, the amount of the nitrile monomer can be sufficient, and the resulting thermally expandable microcapsule has favorable heat resistance and favorable gas barrier properties, is not likely to break or shrink at high temperatures, and can foam with a high expansion ratio.

The amount of the carboxyl group-containing monomer in the monomer composition is preferably 0.001 parts by weight or less for each 100 parts by weight of the whole monomer components. In particular, the monomer composition is preferably free from carboxyl group-containing monomers.

In the case that the composition contains the carboxyl group-containing monomer, mainly the residual monomer of the carboxyl group-containing monomer promotes oxidative degradation of the base material resin used for molding, which may color the molded product to yellowish brown. Also in this case, the residual monomer may be volatilized by heating in the molding, and thereby the irritating odor peculiar to the acid may spread to adversely affect the work environment.

Examples of the carboxyl group-containing monomer include unsaturated monocarboxylic acids such as acrylic acid, methacrylic acid, ethacrylic acid, crotonic acid, and cinnamic acid, and unsaturated dicarboxylic acids such as maleic acid, itaconic acid, fumaric acid, and citraconic acid. The examples also include salts and anhydride of these acids.

To the monomer composition, a polymerization initiator is preferably added.

Examples of the polymerization initiator include, but not particularly limited to, dialkyl peroxides, diacyl peroxides, peroxy esters, peroxydicarbonates, and azo compounds.

Examples of the dialkyl peroxides include, but not particularly limited to, methyl ethyl peroxide, di-t-butyl peroxide, dicumyl peroxide, and isobutyl peroxide.

Examples of the diacyl peroxides include, but not particularly limited to, benzoyl peroxide, 2,4-dichlorobenzoyl peroxide, and 3,5,5-trimethylhexanoyl peroxide.

Examples of the peroxy esters include, but not particularly limited to, t-butyl peroxypivalate, t-hexyl peroxypivalate, t-butyl peroxyneodecanoate, t-hexyl peroxyneodecanoate, 1-cyclohexyl-1-methylethyl peroxyneodecanoate, 1,1,3,3-tetramethylbutyl peroxyneodecanoate, cumyl peroxyneodecanoate, and ($\alpha,\alpha$-bis-neodecanoylperoxy)diisopropylbenzene.

Examples of the peroxydicarbonates include, but not particularly limited to, bis(4-t-butylcyclohexyl) peroxydicarbonate, di-n-propyl-peroxydicarbonate, diisopropyl peroxydicarbonate, di(2-ethylethylperoxy)dicarbonate, dimethoxybutyl peroxydicarbonate, and di(3-methyl-3-methoxybutylperoxy)dicarbonate.

Examples of the azo compounds include, but not particularly limited to, 2,2'-azobisisobutyronitrile, 2,2'-azobis(4-methoxy-2,4-dimethylvaleronitrile), 2,2'-azobis(2,4-dimethylvaleronitrile), and 1,1'-azobis(1-cyclohexanecarbonitrile).

To the monomer composition, components such as a stabilizer, an ultraviolet absorber, an antioxidant, an antistatic agent, a flame retardant, a silane coupling agent, and a colorant may be further added if necessary.

The weight average molecular weight of the polymer obtained by polymerizing the above monomer composition is not particularly limited, but the lower limit thereof is preferably 100,000, and the upper limit thereof is preferably 2,000,000.

If the weight average molecular weight is 100,000 or more, the resulting thermally expandable microcapsule has favorable strength of the shell, is not likely to break or shrink at high temperatures, and can foam with a high expansion ratio. If the weight average molecular weight is 2,000,000 or less, the resulting thermally expandable microcapsule has shell strength not excessively high, and has favorable foamability.

The thermally expandable microcapsule of the present invention encapsulates a volatile expansion agent as a core agent.

The volatile expansion agent herein refers to a substance that becomes gaseous at a temperature equal to or lower than the softening point of the shell.

Examples of the volatile expansion agent include low molecular weight hydrocarbons such as ethane, ethylene, propane, propene, n-butane, isobutane, butene, isobutene, n-pentane, isopentane, neopentane, n-hexane, heptane, and petroleum ether; chlorofluorocarbons such as $CCl_3F$, $CCl_2F_2$, $CClF_3$, and $CClF_2$—$CClF_2$; and tetraalkylsilanes such as tetramethylsilane, trimethylethylsilane, trimethylisopropylsilane, and trimethyl-n-propylsilane. In particular, isobutane, n-butane, n-pentane, isopentane, n-hexane, petroleum ether, and mixtures of these are preferred. These volatile expansion agents may be used alone or in combination.

Preferred among the above volatile expansion agents for the thermally expandable microcapsule of the present invention is a $C_{10}$ or lower low-boiling-point hydrocarbon. Such a hydrocarbon leads to production of a thermally expandable microcapsule that has a high expansion ratio and quickly starts foaming.

Also, the volatile expansion agent may be a pyrolytic compound that is pyrolyzed into a gaseous form by heat.

In the thermally expandable microcapsule of the present invention, the lower limit of the amount of the volatile expansion agent used as a core agent is preferably 10% by weight, and the upper limit thereof is preferably 25% by weight.

Although the thickness of the shell changes depending on the amount of the core agent, reducing the amount of the core agent to excessively thicken the shell leads to a decrease in the foamability, while increasing the amount of the core agent leads to a decrease in the strength of the shell. If the amount of the core agent is 10 to 25% by weight, the thermally expandable microcapsule can achieve both prevention of deflation and increase in the foamability.

The maximum foaming temperature (Tmax) of the thermally expandable microcapsule of the present invention is not particularly limited, but the lower limit thereof is preferably 200° C. If the maximum foaming temperature is 200° C. or higher, the thermally expandable microcapsule has favorable heat resistance, is less likely to break or shrink at high temperatures, and can foam with a high expansion ratio. Also, if the maximum foaming temperature is 200° C. or higher, then in production of a masterbatch pellet using the thermally expandable microcapsule, for example, the microcapsule is not foamed by shearing force from pellet production, and thereby a non-foamed masterbatch pellet can be stably produced. The lower limit of the maximum foaming temperature of the thermally expandable microcapsule is more preferably 210° C.

The maximum foaming temperature herein refers to the temperature at which the thermally expandable microcapsule shows the maximum displacement amount when the diameter of the thermally expandable microcapsule is measured while the thermally expandable microcapsule is heated from the ordinary temperature.

The upper limit of the foaming starting temperature (Ts) of the thermally expandable microcapsule of the present invention is preferably 200° C. If the foaming starting temperature is 200° C. or lower, the resulting product has a favorable expansion ratio even in the case of injection molding. The lower limit of the foaming starting temperature is preferably 130° C., and the upper limit thereof is more preferably 180° C.

The volume average particle size of the thermally expandable microcapsule of the present invention is not particularly limited, but the lower limit is preferably 10 μm, and the upper limit is preferably 50 μm. If the volume average particle size is 10 μm or greater, then even in the case of mixing the thermally expandable microcapsule into a matrix resin in molding, the size of air bubbles in the resulting foaming mold is sufficient, and thereby the weight of the foaming mold can be sufficiently reduced. If the volume average particle size is 50 μm or less, then even in the case of mixing the thermally expandable microcapsule into a matrix resin in molding, the size of the air bubbles in the resulting thermally expandable microcapsule is not excessively large, and the strength can be sufficiently maintained. The lower limit of the volume average particle size is more preferably 15 μm, and the upper limit thereof is more preferably 40 μm.

Examples of the method for producing the thermally expandable microcapsule of the present invention include, but not particularly limited to, a method of producing a thermally expandable microcapsule that includes a shell containing a polymer obtained by polymerizing a monomer composition, and a volatile expansion agent as a core agent encapsulated by the shell, the method including the steps of: preparing an aqueous dispersion medium; dispersing into the aqueous dispersion medium an oily mixture that contains a monomer composition containing a nitrile monomer and a compound containing a glycidyl group in a molecule, and a volatile expansion agent; and polymerizing the monomer composition.

In the step of preparing an aqueous dispersion medium, an aqueous dispersion medium containing a dispersion stabilizer is prepared by charging a polymerization reaction vessel with water, a dispersion stabilizer, and if necessary an auxiliary stabilizer. Also, to the aqueous dispersion medium, alkali metal nitrite, stannous chloride, stannic chloride, and potassium dichromate may be added if necessary.

Examples of the dispersion stabilizer include, but not particularly limited to, silica, calcium phosphate, magnesium hydroxide, aluminum hydroxide, ferric hydroxide, barium sulfate, calcium sulfate, sodium sulfate, calcium oxalate, calcium carbonate, barium carbonate, and magnesium carbonate.

Examples of the auxiliary stabilizer include, but not particularly limited to, condensation products of diethanolamine and aliphatic dicarboxylic acid, condensation products of urea and formaldehyde, water-soluble nitrogen-containing compounds, polyethylene oxide, tetramethyl ammonium hydroxide, gelatin, methyl cellulose, polyvinyl alcohol, dioctyl sulfosuccinate, sorbitan esters, and various emulsifiers.

Examples of the water-soluble nitrogen-containing compounds include, but not particularly limited to, polyvinyl pyrrolidone, polyethylene imine, polyoxyethylene alkylamine, polydialkyl aminoalkyl (meth)acrylates represented by polydimethyl aminoethyl methacrylate and polydimethyl aminoethyl acrylate, polydialkyl aminoalkyl (meth)acrylamides represented by polydimethyl aminopropyl acrylamide and polydimethyl aminopropyl methacrylamide, polyacrylamide, polycationic acrylamide, polyamine sulfone, and polyallylamine. In particular, polyvinyl pyrrolidone is preferred.

Examples of the combination of the dispersion stabilizer and the auxiliary stabilizer include, but not particularly limited to, a combination of colloidal silica and a condensation product, a combination of colloidal silica and a water-soluble nitrogen-containing compound, and a combination of an emulsifier and magnesium hydroxide or calcium phosphate. Preferred among these is the combination of colloidal silica and a condensation product. The condensation product is preferably a condensation product of diethanol amine and aliphatic dicarboxylic acid, and particularly preferably a condensation product of diethanol amine and adipic acid, or a condensation product of diethanol amine and itaconic acid.

In the case of using colloidal silica as the dispersion stabilizer, the amount of colloidal silica added is not particularly limited, and can be appropriately determined depending on the target particle size of the thermally expandable microcapsule. The lower limit of the amount is preferably 1 part by weight, and the upper limit is preferably 20 parts by weight, for each 100 parts by weight of the whole monomer components. The lower limit is more preferably 2 parts by weight, and the upper limit is more preferably 10 parts by weight, for each 100 parts by weight of the whole monomer components.

In the case of using the condensation product or the water-soluble nitrogen-containing compound as the auxiliary stabilizer, the amount of the condensation product or water-soluble nitrogen-containing compound is not particularly limited, and can be appropriately determined depending on the target particle size of the thermally expandable microcapsule. Here, the lower limit of the amount is preferably 0.05 parts by weight, and the upper limit thereof is preferably 2 parts by weight, for each 100 parts by weight of the whole monomer components.

To the aqueous dispersion medium, inorganic salts such as sodium chloride and sodium sulfate may be further added as well as the dispersion stabilizer and the auxiliary stabilizer. Addition of such an inorganic salt allows production of a thermally expandable microcapsule that has more uniform particle shape.

The amount of the inorganic salt added is not particularly limited, but the upper limit thereof is 100 parts by weight for each 100 parts by weight of the whole monomer components.

The aqueous dispersion medium is prepared by mixing the dispersion stabilizer and the auxiliary stabilizer into deionized water, and the pH of the deionized water can be appropriately determined depending on the dispersion stabilizer and auxiliary stabilizer used. For example, in the case of using silica such as colloidal silica as the dispersion stabilizer, an acid such as hydrochloric acid is added, if necessary, to the system so as to give the system a pH of 3 to 4, and polymerization is performed under an acid condition in the later-described step. Also, in the case of using magnesium hydroxide or calcium phosphate as the dispersion stabilizer, the system is adjusted to be alkaline, and polymerization is performed under an alkaline condition in the later-described step.

In production of the thermally expandable microcapsule of the present invention, a step is then performed which includes dispersing into the aqueous dispersion medium an oily mixture that contains the monomer composition, a polyfunctional reactive compound, and the volatile expansion agent.

In this step, the monomer composition, the polyfunctional reactive compound, and the volatile expansion agent may be separately added to the aqueous dispersion medium to prepare the oily mixture in the aqueous dispersion medium. Usually, however, these components are mixed in advance so that an oily mixture is produced, and then the oily mixture is added to the aqueous dispersion medium. At this time, they may be added to a polymerization reaction vessel after preparing the oily mixture and the aqueous dispersion medium separately in different vessels in advance, and dispersing the oily mixture in the aqueous dispersion medium by mixing these components with stirring in another vessel.

Here, a polymerization initiator is used to polymerize the monomers in the monomer composition, and the polymerization initiator may be added to the oily mixture in advance, or may be added to a mixture of the aqueous dispersion medium and the oily mixture obtained by mixing them with stirring in a polymerization reaction vessel.

In the step of dispersing the oily mixture containing the monomer composition and the volatile expansion agent into the aqueous dispersion medium, the oily mixture having a predetermined particle size is emulsion-dispersed into the aqueous dispersion medium.

Examples of the method for emulsion dispersion include, but not particularly limited to, a method including stirring with a homomixer (e.g. produced by Tokushu Kika Kogyo Co., Ltd.), and a method including passing the mixture through a static dispersion apparatus such as a line mixer and an element static dispersion machine. Here, the aqueous dispersion medium and the oily mixture may be separately supplied to the static dispersion apparatus, or a dispersion liquid obtained by mixing and stirring in advance may be supplied to the dispersion apparatus.

In production of the thermally expandable microcapsule of the present invention, the step of polymerizing the monomer composition is then performed. Examples of the method for polymerization include, but not particularly limited to, a method including polymerization of the monomer composition by heating.

In this manner, a thermally expandable microcapsule is obtained which includes a shell containing a polyfunctional reactive compound and a polymer obtained by polymerizing a monomer composition containing a nitrile monomer and a hydroxy group-containing monomer, and a volatile expansion agent as a core agent encapsulated by the shell. The obtained thermally expandable microcapsule may be subjected to the subsequent steps such as a dehydration step and a drying step.

The application of the thermally expandable microcapsule of the present invention is not particularly limited. For example, by mixing the thermally expandable microcapsule of the present invention into a matrix resin and molding the mixture by a molding method such as injection molding or extrusion molding, a foaming mold can be produced which has properties such as heat shielding properties, heat insulation properties, sound insulation properties, sound absorbing properties, vibration proof, and light weight. The thermally expandable microcapsule of the present invention is suitable for foam molding which includes a step of heating at high temperatures, because the microcapsule is not likely to break or shrink even at high temperatures, and can foam with a high expansion ratio.

A foaming mold can be produced by molding a masterbatch pellet obtained by adding a matrix resin (e.g. thermoplastic resin) to the thermally expandable microcapsule of the present invention by a molding method such as injection molding, and foaming the thermally expandable microcapsule by heat from molding. Such a masterbatch is also one aspect of the present invention.

The thermoplastic resin is not particularly limited as long as it does not provide any adverse effect on the object of the present invention. Examples thereof include common thermoplastic resins such as polyvinyl chloride, polystyrene, polypropylene, polypropylene oxide, and polyethylene; and engineering plastics such as polybutylene terephthalate, nylon, polycarbonate, and polyethylene terephthalate. Thermoplastic elastomers such as ethylene, vinyl chloride, olefin, urethane, or ester thermoplastic elastomers may also be used. Alternatively, these resins may be used in combination.

The appropriate amount of the thermally expandable microcapsule is 0.5 to 20 parts by weight, and preferably 1 to 10 parts by weight, for each 100 parts by weight of the thermoplastic resin. The thermally expandable microcapsule may also be used together with chemical foaming agents such as sodium hydrogen carbonate (baking soda) and ADCA (azo-type).

The method for producing the masterbatch pellet is not particularly limited. Examples thereof include a method including kneading beforehand raw materials such as a matrix resin (e.g. thermoplastic resin) and various additives with an apparatus such as a same-direction twin-screw extruder; heating the mixture to a predetermined temperature; adding a foaming agent such as the thermally expandable microcapsule of the present invention; further kneading the mixture to provide a kneaded product; and cutting the kneaded product into a pellet shape having a desired size with a pelletizer to give a masterbatch pellet.

The masterbatch pellet having a pellet shape may alternatively be produced by kneading raw materials such as a matrix resin (e.g. thermoplastic resin) and thermally expandable microcapsules with a batch-type kneader, and granulating the mixture with a granulator.

The kneader is not particularly limited as long as it is able to knead the raw materials without breaking the thermally expandable microcapsules. Examples thereof include a pressurizing kneader and a Banbury mixer.

Advantageous Effects of Invention

The present invention can provide a thermally expandable microcapsule that has sufficient shape retention properties, is not likely to be deflated, and can suppress inducement of aggregation in polymerization, while exhibiting high foamability and durability at high temperatures. Also, the present invention can produce a mold having excellent appearance without causing coloring or white spots when used in foam molding, is not likely to cause odor in foam molding, and can reduce sticking of impurities such as scales. Hence, the present invention can provide a thermally expandable microcapsule that can suppress a decrease in the workability. The present invention can also provide a foamable thermoplastic resin masterbatch and a foaming mold containing the thermally expandable microcapsule, and a method for producing the thermally expandable microcapsule.

DESCRIPTION OF EMBODIMENTS

The present invention is described below in more detail based on examples which, however, are not intended to limit the scope of the present invention.

Examples 1 to 26, Comparative Examples 1 to 21

A polymerization reaction vessel was charged with water (250 parts by weight), colloidal silica (25 parts by weight, 20% by weight, produced by Asahi Denka) as a dispersion stabilizer, polyvinyl pyrrolidone (0.8 parts by weight, produced by BASF), and 1-N hydrochloric acid (1.8 parts by weight) so that an aqueous dispersion medium was prepared.

To the aqueous dispersion medium, an oily mixture containing a monomer composition, a volatile expansion agent, and a polymerization initiator (2,2'-azobisisobutyronitrile (0.8 parts by weight), 2,2'-azobis(2,4-dimethylvaleronitrile (0.6 parts by weight)) at a blending ratio shown in any of Tables 1 to 4 were added and suspended. Thereby, a dispersion liquid was prepared. The resulting dispersion liquid was mixed with stirring using a homogenizer and placed in a nitrogen-substituted pressure polymerization vessel. The dispersion liquid was allowed to react for 6 hours at 60° C. and 5 hours at 80° C. (20 hours at 60° C. in Examples 6 to 26 and Comparative Examples 5 to 21) while being pressurized (0.5 MPa), so that a reaction product was obtained. The reaction product was filtered and washed with water repeatedly. The resulting matter was dried to give a thermally expandable microcapsule.

The compounds having a glycidyl group in a molecule used are as follows.

Bisphenol A-type epoxy resin (jER-828: produced by Mitsubishi Chemical Corporation, the number of radical polymerizable double bonds: 0, the number of glycidyl groups: 2)

Aminophenol type epoxy resin (jER-630: produced by Mitsubishi Chemical Corporation, the number of radical polymerizable double bonds: 0, the number of glycidyl groups: 3)

Glycidyl methacrylate (produced by Kyoeisha Chemical Co., Ltd., the number of radical polymerizable double bonds: 1, the number of glycidyl groups: 1)

Diethylene glycol diglycidyl ether (EX-850: produced by Nagase ChemteX Corporation, the number of glycidyl groups: 2)

The hydroxy group-containing monomers used are as follows.

2-hydroxyethyl methacrylate (the number of radical polymerizable double bonds: 1, the number of hydroxy groups: 1)

2-hydroxybutyl methacrylate (the number of radical polymerizable double bonds: 1, the number of hydroxy groups: 1)

The monomers having at least two double bonds in a molecule used are as follows.

Ethylene glycol dimethacrylate (the number of radical polymerizable double bonds: 2)

1,4-butanediol diacrylate (the number of radical polymerizable double bonds: 2)

(Evaluation)

The following evaluations were performed on the thermally expandable microcapsules obtained in the examples and comparative examples. The results are shown in Tables 5 to 8.

(1) Gel Fraction Measurement
(Gel Fraction at Ordinary Temperature)

The obtained thermally expandable microcapsule (0.5 g (a [g])) and N,N-dimethylformamide (20.0 g) were weighed into a glass tube, and heated at 70° C. for 24 hours. After heating, the mixture was centrifuged in a centrifugal separator at 10,000 rpm for 15 minutes, and the supernatant was discarded. The precipitated gel was dried in vacuo for 48 hours in a 70° C. vacuum dryer. The weight (b [g]) of the dried gel content was determined. Subsequently, the gel fraction (x) at ordinary temperature was calculated from the following formula.

$$\text{Gel fraction }(x)\text{ at ordinary temperature} = (b/a) \times 100 \, (\%)$$

(Gel Fraction Upon Heating at 180° C. For 30 Minutes)

The obtained thermally expandable microcapsule (1.0 g) was weighed into an aluminum cup, and heated in a 180° C. hot air oven for 30 minutes. The heated sample (0.5 g (c [g])) and N,N-dimethylformamide (20.0 g) were weighed into a glass tube, and heated at 70° C. for 24 hours. After heating, the mixture was centrifuged in a centrifugal separator at 10,000 rpm for 15 minutes, and the supernatant was discarded. The precipitated gel was dried in vacuo for 48 hours in a 70° C. vacuum dryer. The weight (d [g]) of the dried gel content was determined.

$$\text{Gel fraction }(y)\text{ after heating at 180° C. for 30 minutes} = (d/c) \times 100 \, (\%)$$

Also, the value of (y/x) was calculated.

(2) Degree of Cross-Linkage Measurement
(Degree of Cross-Linkage Upon Heating at 140° C. For 30 Minutes)

The obtained thermally expandable microcapsule (0.1 g) was weighed into an aluminum cup, and heated in a 140° C. hot air oven for 30 minutes. The heated sample (0.1 g (a [g])) and N,N-dimethylformamide (20.0 g) were weighed into a glass tube, and heated at 75° C. for 24 hours. After heating, the mixture was centrifuged in a centrifugal separator at 20,000 rpm for 30 minutes, and the supernatant was discarded. The precipitated undissolved substance was dried in vacuo for 48 hours in a 75° C. vacuum dryer, and the weight (b [g]) of the dried undissolved substance was measured.

Subsequently, the degree (A) of cross-linkage after heating at 140° C. for 30 minutes was calculated from the following formula.

Degree (A) of cross-linkage after heating at 140° C. for 30 minutes=(b/a)×100(%)

(Degree of Cross-Linkage after Heating at 210° C. For 30 Minutes)

The obtained thermally expandable microcapsule (0.1 g) was weighed into an aluminum cup, and heated in a 210° C. hot air oven for 30 minutes. The heated sample (0.1 g (c [g])) and N,N-dimethylformamide (20.0 g) were weighed into a glass tube, and heated at 75° C. for 24 hours. After heating, the mixture was centrifuged in a centrifugal separator at 20,000 rpm for 30 minutes, and the supernatant was discarded. The precipitated undissolved substance was dried in vacuo for 48 hours in a 75° C. vacuum dryer, and the weight (d [g]) of the dried undissolved substance was measured. Subsequently, the degree (B) of cross-linkage after heating at 210° C. for 30 minutes was calculated from the following formula.

Degree (B) of cross-linkage after heating at 210° C. for 30 minutes=(d/c)×100(%)

(Calculation of B/A)

From the obtained degree (A) of cross-linkage after heating at 140° C. for 30 minutes and the degree (B) of cross-linkage after heating at 210° C. for 30 minutes, the value of (B/A) was calculated.

(3) Storage Elastic Modulus Measurement

The obtained thermally expandable microcapsule (0.5 g) and N,N-dimethylformamide (30.0 g) were weighed into a glass tube, and heated at 75° C. for 24 hours. After heating, the mixture was poured into an aluminum cup, and pre-dried by heating in a 50° C. hot air oven for 24 hours. After pre-drying, the mixture was dried in vacuo in a 75° C. vacuum dryer for 48 hours, and the resulting product as a polymer constituting a shell was formed into a sheet-form sample.

Subsequently, the sheet-form sample was cut into a size of 30 mm×5 mm, and the cut sample was heated at a frequency of 10 Hz and a rate of temperature rise of 5° C./min. The storage elastic modulus (X) at a temperature of 140° C. and a frequency of 10 Hz and the storage elastic modulus (Y) at a temperature of 210° C. and a frequency of 10 Hz were measured by using DVA-200 (produced by IT Keisoku Seigyo Co., Ltd.). Also, the value of (Y/X) was calculated.

(4) Differential Scanning Calorimetry (DSC)

The obtained thermally expandable microcapsule (0.5 g) and N,N-dimethylformamide (30.0 g) were weighed into a glass tube, and heated at 75° C. for 24 hours. After heating, the mixture was poured into an aluminum cup, and pre-dried by heating in a 50° C. hot air oven for 24 hours. After pre-drying, the mixture was dried in vacuo in a 75° C. vacuum dryer for 48 hours, and the resulting product as a polymer constituting a shell was formed into a sheet-form sample.

Subsequently, the sheet-form sample was heated at a rate of temperature rise of 5° C./min. With the amount of generated heat at a temperature of 140° C. as a start point and the amount of generated heat at a temperature of 210° C. as an end point, the presence of an inflection point that forms a projected portion over a straight line formed by connecting the start point and the end point was determined with DSC6220 (produced by Yamato Scientific Co., Ltd.). Also, the temperature (maximum heat generation temperature) at the inflection point (when the amount of generated heat was the maximum) was measured.

(5) Expansion Ratio

Using a heat foaming stage microscope (produced by JAPAN HIGH TECH CO., LTD.), the expansion behavior of a small amount of the resulting thermally expandable microcapsule dispersed on the stage was observed up to 280° C. while the capsules were heated at 5° C./min. The diameters $\phi T$ of any five particles of the thermally expandable microcapsule in the observed image were measured each time the temperature rises 5° C. by using calipers, so that the average diameters $\phi T(Ave)$ at the respective temperatures were determined. With the expansion ratio DT at each temperature=$\phi T(Ave)/\phi 30$, DT at the temperature where the DT is the maximum was taken as the maximum expansion ratio DTmax.

Here, $\phi 30$ refers to the diameter of the thermally expandable microcapsule at 30° C.

A sample with the maximum expansion ratio of less than three times was evaluated as "x" (poor). A sample with the maximum expansion ratio of three times or greater and less than five times was evaluated as "○" (good). A sample with the maximum expansion ratio of five times or more was evaluated as "○○" (very good).

(6) Heat Resistance

Using a heat foaming stage microscope (produced by JAPAN HIGH TECH CO., LTD.), the expansion behavior was observed under the same conditions as in the case of the expansion ratio, and the expansion ratio D220 at 220° C. was measured with the diameter of unexpanded thermally expandable microcapsule being taken as 1 time. A sample with D220 of less than two times the unexpanded was evaluated as "x" (poor). A sample with D220 of two times or greater and less than three times the unexpanded was evaluated as "○" (good). A sample with D220 of three times or greater and less than four times the unexpanded was evaluated as "○○" (very good). A sample with D220 of four times or greater the unexpanded was evaluated as "○○○" (excellent).

(7) Durability

Using a heat foaming stage microscope (produced by JAPAN HIGH TECH CO., LTD.), the expansion behavior was observed under the same conditions as in the case of the expansion ratio, and the temperature range ($\Delta T$) where the expansion ratio was two times or greater was determined. A sample with $\Delta T$ of less than 50° C. was evaluated as "x" (poor). A sample with $\Delta T$ of 50° C. or more and less than 65° C. was evaluated as "○" (good). A sample with $\Delta T$ of 65° C. or more and less than 80° C. was evaluated as "○○" (very good). A sample with $\Delta T$ of 80° C. or more was evaluated as "○○○" (excellent).

(8) Odor

The obtained thermally expandable microcapsule (1.0 g) was weighed into an aluminum cup, made as flat as possible, and then heated in a 180° C. hot air oven (produced by ESPEC Corp., ST-110) for 1 minute. A sample that produced acid odor when the door of the oven was opened after heating was evaluated as "x" (poor). A sample that produced no acid odor when the door of the oven was opened after heating was evaluated as "○" (good).

(9) Coloring

The obtained thermally expandable microcapsule (1.25 g), plasticized polyvinyl chloride (20 g, PQ92, produced by Shin Dai-ichi Vinyl Corporation), calcium carbonate (10 g, P-50, produced by SHIRAISHI CALCIUM KAISHA, LTD.), and a plasticizer (20 g, DINP, produced by Wako Pure Chemical Industries, Ltd.) were stirred with a planetary disperser, so that a paste-like sample was obtained. The paste-like sample (5 g) was weighed into an aluminum cup with a diameter of about 50 mm, and heated in a 180° C. hot air oven for 10 minutes. The appearance of the heated sample was visually observed. A sample which turned into dark brown was evaluated as "x" (poor). A sample which turned into yellow was evaluated as "○" (good). A sample which turned into pale yellowish white or cream color was evaluated as "○○" (very good). A sample which turned into white was evaluated as "○○○" (excellent).

(10) Appearance (White Spots)

The obtained thermally expandable microcapsule (1.25 g), plasticized polyvinyl chloride (20 g, PQ92, produced by Shin Dai-ichi Vinyl Corporation), calcium carbonate (10 g, P-50, produced by SHIRAISHI CALCIUM KAISHA, LTD.), a plasticizer (20 g, DINP, produced by Wako Pure Chemical Industries, Ltd.), and a pigment (0.1 g, polyethylene masterbatch containing carbon black) were stirred with a planetary disperser, so that a paste-like sample was obtained. The paste-like sample (5 g) was weighed into an aluminum cup with a diameter of about 50 mm, and heated in a 180° C. hot air oven for 10 minutes. The surface of the heated sample was visually observed, and a sample observed to have many white spots was evaluated as "x" (poor), and a sample observed to have a few or almost no white spots was evaluated as "○" (good).

(11) Constant Temperature Retention Properties at 200° C. Over 30 Minutes

Using a thermomechanical measurement apparatus (TMA: produced by TA Instruments), the retention ratio of the expansion displacement after an elapse of 30 minutes at 200° C. was determined. When the expansion displacement determined at 200° C. by heating the samples at a rate of temperature rise of 30° C./min was taken as 100%, a sample showing a retention ratio of the expansion ratio after 30 minutes of 70% or higher was evaluated as "○○○" (excellent), a sample showing a retention ratio of 35% or higher and lower than 70% was evaluated as "○○" (very good), a sample showing a retention ratio of 10% or higher and lower than 35% was evaluated as "○" (good), and a sample showing a retention ratio of lower than 10% was evaluated as "x" (poor).

(12) Compression Resistance

The expansion displacement determined by heating the samples at a rate of temperature rise of 30° C./min up to 180° C. at a load of 0.01 mN using a thermomechanical measurement apparatus (TMA: produced by TA Instruments) was taken as 100%. Then, the rate of decrease of the expansion displacement when the load was increased to 0.05 mN was measured. A sample showing a rate of decrease of the expansion displacement of lower than 20% was evaluated as "○○○" (excellent), a sample showing a rate of decrease of 20% or higher and lower than 50% was evaluated as "○○" (very good), a sample showing a rate of decrease of 50% or higher and lower than 80% was evaluated as "○" (good), and a sample showing a rate of decrease of 80% or higher was evaluated as "x" (poor).

(13) Crack Property (Cohesiveness)

The thermally expandable microcapsule (100 g) was filtered through a sieve (sieve opening: 150 μm, wire diameter: 100 μm, produced by TOKYO SCREEN CO., LTD.) for 5 minutes, and the thermally expandable microcapsule passed through the opening was weighed. Using the measured values, the sieving efficiency of the thermally expandable microcapsule was calculated from the following formula. A sample with a shieving efficiency of lower than 75% was evaluated as "x" (poor), a sample with a shieving efficiency of 75% or higher and lower than 85% was evaluated as "○" (good), and a sample with a shieving efficiency of 85% or higher was evaluated as "○○" (very good).

Sieving efficiency (%)=(weight of thermally expandable microcapsule that passed the opening)/ (weight of thermally expandable microcapsule before shieving)

(14) Scale Sticking

After the polymerization reaction, a sample leaving scales on the surface of the polymerization reaction vessel walls which could not have been easily removed by water washing was evaluated as "x" (poor), and a sample leaving scales which could have been easily removed by water washing was evaluated as "○" (good).

TABLE 1

| | | Example 1 | Example 2 | Example 3 | Example 4 | Example 5 | Example 6 | Example 7 |
|---|---|---|---|---|---|---|---|---|
| Nitrile monomer | Acrylonitrile | 63.0 | 63.0 | 60.0 | 63.0 | 61.0 | 95.7 | 93.7 |
| | Methacrylonitrile | 33.4 | 33.0 | 30.4 | 33.4 | 32.4 | — | — |
| Compound containing glycidyl group in molecule | Bisphenol A-type epoxy resin | 3.0 | 3.0 | 3.0 | — | — | — | — |
| | Aminophenol-type epoxy resin | — | — | — | 3.0 | 3.0 | — | — |
| | Glycidyl methacrylate | — | — | — | — | — | 1.0 | 1.0 |
| | Diethyleneglycol diglycidyl ether | — | — | — | — | — | — | — |
| Hydroxy group-containing monomer | 2-Hydroxyethyl methacrylate | 3.0 | 3.0 | 9.0 | 3.0 | 6.0 | — | — |
| | 2-Hydroxybutyl methacrylate | — | — | — | — | — | — | — |
| Amide group-containing monomer | Acrylamide | — | — | — | — | — | — | — |
| | Methacrylamide | — | — | — | — | — | 3.0 | 5.0 |
| | N-methylol acrylamide | — | — | — | — | — | — | — |
| | N,N-dimethyl acrylamide | — | — | — | — | — | — | — |
| Monomer containing at least two double bonds in molecule | Ethyleneglycol dimethacrylate | — | — | — | — | — | 0.3 | 0.3 |
| | 1,4-Butanediol dimethacrylate | 0.6 | 1.0 | 0.6 | 0.6 | 0.6 | — | — |

TABLE 1-continued

| | | | | | | | | |
|---|---|---|---|---|---|---|---|---|
| Other monomers | Methacrylic acid | — | — | — | — | — | — | — |
| | Methyl methacrylate | — | — | — | — | — | — | — |
| Volatile expansion agent | Isopentane | 30 | 30 | 30 | 30 | 30 | 30 | 30 |

| | | Example 8 | Example 9 | Example 10 | Example 11 | Example 12 | Example 13 |
|---|---|---|---|---|---|---|---|
| Nitrile monomer | Acrylonitrile | 88.7 | 93.7 | 93.7 | 93.7 | 93.7 | 93.7 |
| | Methacrylonitrile | — | — | — | — | — | — |
| Compound containing glycidyl group in molecule | Bisphenol A-type epoxy resin | — | 1.0 | — | — | — | — |
| | Aminophenol-type epoxy resin | — | — | — | — | — | — |
| | Glycidyl methacrylate | 1.0 | — | — | 1.0 | 1.0 | 1.0 |
| | Diethyleneglycol diglycidyl ether | — | — | 1.0 | — | — | — |
| Hydroxy group-containing monomer | 2-Hydroxyethyl methacrylate | — | — | — | — | — | — |
| | 2-Hydroxybutyl methacrylate | — | — | — | — | — | — |
| Amide group-containing monomer | Acrylamide | — | — | — | 5.0 | — | — |
| | Methacrylamide | 10 | 5.0 | 5.0 | — | — | — |
| | N-methylol acrylamide | — | — | — | — | 5.0 | — |
| | N,N-dimethyl acrylamide | — | — | — | — | — | 5.0 |
| Monomer containing at least two double bonds in molecule | Ethyleneglycol dimethacrylate | 0.3 | 0.3 | 0.3 | 0.3 | 0.3 | 0.3 |
| | 1,4-Butanediol dimethacrylate | — | — | — | — | — | — |
| Other monomers | Methacrylic acid | — | — | — | — | — | — |
| | Methyl methacrylate | — | — | — | — | — | — |
| Volatile expansion agent | Isopentane | 30 | 30 | 30 | 30 | 30 | 30 |

TABLE 2

| | | Example 14 | Example 15 | Example 16 | Example 17 | Example 18 | Example 19 | Example 20 |
|---|---|---|---|---|---|---|---|---|
| Nitrile monomer | Acrylonitrile | 98.7 | 94.7 | 91.7 | 65 | 95.4 | 91.4 | 88.4 |
| | Methacrylonitrile | — | — | — | — | — | — | — |
| Compound containing glycidyl group in molecule | Bisphenol A-type epoxy resin | — | — | — | — | — | — | — |
| | Aminophenol-type epoxy resin | — | — | — | — | — | — | — |
| | Glycidyl methacrylate | 0.1 | 0.4 | 3.0 | 15 | 1.0 | 3.0 | 1.0 |
| | Diethyleneglycol diglycidyl ether | — | — | — | — | — | — | — |
| Hydroxy group-containing monomer | 2-Hydroxyethyl methacrylate | — | — | — | — | — | — | — |
| | 2-Hydroxybutyl methacrylate | — | — | — | — | — | — | — |
| Amide group-containing monomer | Acrylamide | — | — | — | — | — | — | — |
| | Methacrylamide | 0.9 | 5.0 | 5.0 | 20 | 3.0 | 5.0 | 10 |
| | N-methylol acrylamide | — | — | — | — | — | — | — |
| | N,N-dimethyl acrylamide | — | — | — | — | — | — | — |
| Monomer containing at least two double bonds in molecule | Ethyleneglycol dimethacrylate | 0.3 | 0.3 | 0.3 | 0.3 | 0.6 | 0.6 | 0.6 |
| | 1,4-Butanediol dimethacrylate | — | — | — | — | — | — | — |
| Other monomers | Methacrylic acid | — | — | — | — | — | — | — |
| | Methyl methacrylate | — | — | — | — | — | — | — |
| Volatile expansion agent | Isopentane | 30 | 30 | 30 | 30 | 30 | 30 | 30 |

| | | Example 21 | Example 22 | Example 23 | Example 24 | Example 25 | Example 26 |
|---|---|---|---|---|---|---|---|
| Nitrile monomer | Acrylonitrile | 64.4 | 96 | 92 | 89 | 65 | 81.4 |
| | Methacrylonitrile | — | — | — | — | — | — |
| Compound containing glycidyl group in molecule | Bisphenol A-type epoxy resin | — | — | — | — | — | — |
| | Aminophenol-type epoxy resin | — | — | — | — | — | — |
| | Glycidyl methacrylate | 15 | 1.0 | 3.0 | 1.0 | 15 | 3.0 |
| | Diethyleneglycol diglycidyl ether | — | — | — | — | — | — |
| Hydroxy group-containing monomer | 2-Hydroxyethyl methacrylate | — | — | — | — | — | — |
| | 2-Hydroxybutyl methacrylate | — | — | — | — | — | — |
| Amide group-containing monomer | Acrylamide | — | — | — | — | — | 15 |
| | Methacrylamide | 20 | 3.0 | 5.0 | 10 | 20 | — |
| | N-methylol acrylamide | — | — | — | — | — | — |
| | N,N-dimethyl acrylamide | — | — | — | — | — | — |
| Monomer containing at least two double bonds in molecule | Ethyleneglycol dimethacrylate | 0.6 | — | — | — | — | 0.6 |
| | 1,4-Butanediol dimethacrylate | — | — | — | — | — | — |
| Other monomers | Methacrylic acid | — | — | — | — | — | — |
| | Methyl methacrylate | — | — | — | — | — | — |
| Volatile expansion agent | Isopentane | 30 | 30 | 30 | 30 | 30 | 30 |

TABLE 3

| | | Comparative Example 1 | Comparative Example 2 | Comparative Example 3 | Comparative Example 4 | Comparative Example 5 | Comparative Example 6 |
|---|---|---|---|---|---|---|---|
| Nitrile monomer | Acrylonitrile | 65.0 | 50.0 | 49.0 | 63 | 50.7 | 84.7 |
| | Methacrylonitrile | 34.0 | 29.0 | 29.0 | 34 | — | — |
| Compound containing glycidyl group in molecule | Bisphenol A-type epoxy resin | — | — | — | — | — | — |
| | Aminophenol-type epoxy resin | — | — | — | — | — | — |
| | Glycidyl methacrylate | — | — | 1.0 | — | — | 15 |
| | Diethyleneglycol diglycidyl ether | — | — | — | — | — | — |
| Hydroxy group-containing monomer | 2-Hydroxyethyl methacrylate | — | — | — | 3.0 | — | — |
| | 2-Hydroxybutyl methacrylate | — | — | — | — | — | — |
| Amide group-containing monomer | Acrylamide | — | — | — | — | — | — |
| | Methacrylamide | — | — | — | — | 49 | — |
| | N-methylol acrylamide | — | — | — | — | — | — |
| | N,N-dimethyl acrylamide | — | — | — | — | — | — |
| Monomer containing at least two double bonds in molecule | Ethyleneglycol dimethacrylate | 1.0 | 1.0 | 1.0 | — | 0.3 | 0.3 |
| | 1,4-Butanediol dimethacrylate | — | — | — | — | — | — |
| Other monomers | Methacrylic acid | — | 20 | 20 | — | — | — |
| | Methyl methacrylate | — | — | — | — | — | — |
| Volatile expansion agent | Isopentane | 30 | 30 | 30 | 30 | 30 | 30 |

| | | Comparative Example 7 | Comparative Example 8 | Comparative Example 9 | Comparative Example 10 | Comparative Example 11 |
|---|---|---|---|---|---|---|
| Nitrile monomer | Acrylonitrile | 88.7 | 77.7 | 59.7 | 49.7 | 68.7 |
| | Methacrylonitrile | — | — | — | — | — |
| Compound containing glycidyl group in molecule | Bisphenol A-type epoxy resin | — | — | — | — | — |
| | Aminophenol-type epoxy resin | — | — | — | — | — |
| | Glycidyl methacrylate | 1.0 | — | — | — | 6.0 |
| | Diethyleneglycol diglycidyl ether | — | — | — | — | — |
| Hydroxy group-containing monomer | 2-Hydroxyethyl methacrylate | — | — | — | — | — |
| | 2-Hydroxybutyl methacrylate | — | — | — | — | — |
| Amide group-containing monomer | Acrylamide | — | — | — | — | — |
| | Methacrylamide | — | — | — | — | — |
| | N-methylol acrylamide | — | 2.0 | 20 | 20 | — |
| | N,N-dimethyl acrylamide | — | — | — | 5.0 | — |
| Monomer containing at least two double bonds in molecule | Ethyleneglycol dimethacrylate | 0.3 | 0.3 | 0.3 | 0.3 | 0.3 |
| | 1,4-Butanediol dimethacrylate | — | — | — | — | — |
| Other monomers | Methacrylic acid | — | — | — | 25 | 25 |
| | Methyl methacrylate | 10 | 20 | 20 | — | — |
| Volatile expansion agent | Isopentane | 30 | 30 | 30 | 30 | 30 |

TABLE 4

| | | Comparative Example 12 | Comparative Example 13 | Comparative Example 14 | Comparative Example 15 | Comparative Example 16 |
|---|---|---|---|---|---|---|
| Nitrile monomer | Acrylonitrile | 64.7 | 64.7 | 67.7 | 59.7 | 44.7 |
| | Methacrylonitrile | — | — | — | — | — |
| Compound containing glycidyl group in molecule | Bisphenol A-type epoxy resin | — | — | — | — | — |
| | Aminophenol-type epoxy resin | — | — | — | — | — |
| | Glycidyl methacrylate | — | — | — | — | — |
| | Diethyleneglycol diglycidyl ether | — | — | — | — | — |
| Hydroxy group-containing monomer | 2-Hydroxyethyl methacrylate | — | — | — | — | — |
| | 2-Hydroxybutyl methacrylate | — | — | — | — | — |
| Amide group-containing monomer | Acrylamide | 10 | — | — | 10 | — |
| | Methacrylamide | — | 5.0 | 2.0 | — | 5.0 |
| | N-methylol acrylamide | — | — | — | — | — |
| | N,N-dimethyl acrylamide | — | — | — | — | — |
| Monomer containing at least two double bonds in molecule | Ethyleneglycol dimethacrylate | 0.3 | 0.3 | 0.3 | 0.3 | 0.3 |
| | 1,4-Butanediol dimethacrylate | — | — | — | — | — |

TABLE 4-continued

| | | | | | | |
|---|---|---|---|---|---|---|
| Other monomers | Methacrylic acid | 25 | 30 | 30 | 30 | 50 |
| | Methyl methacrylate | — | — | — | — | — |
| Volatile expansion agent | Isopentane | 30 | 30 | 30 | 30 | 30 |

| | | Comparative Example 17 | Comparative Example 18 | Comparative Example 19 | Comparative Example 20 | Comparative Example 21 |
|---|---|---|---|---|---|---|
| Nitrile monomer | Acrylonitrile | 99.4 | 97 | 69.4 | 68.4 | 69 |
| | Methacrylonitrile | — | — | — | — | — |
| Compound containing glycidyl group in molecule | Bisphenol A-type epoxy resin | — | — | — | — | — |
| | Aminophenol-type epoxy resin | — | — | — | — | — |
| | Glycidyl methacrylate | — | — | 10 | 6.0 | 6.0 |
| | Diethyleneglycol diglycidyl ether | — | — | — | — | — |
| Hydroxy group-containing monomer | 2-Hydroxyethyl methacrylate | — | — | — | — | — |
| | 2-Hydroxybutyl methacrylate | — | — | — | — | — |
| Amide group-containing monomer | Acrylamide | — | — | — | — | — |
| | Methacrylamide | — | — | — | — | — |
| | N-methylol acrylamide | — | — | — | — | — |
| | N,N-dimethyl acrylamide | — | — | — | — | — |
| Monomer containing at least two double bonds in molecule | Ethyleneglycol dimethacrylate | 0.6 | 3.0 | 0.6 | 0.6 | — |
| | 1,4-Butanediol dimethacrylate | — | — | — | — | — |
| Other monomers | Methacrylic acid | — | — | 20 | 25 | 25 |
| | Methyl methacrylate | — | — | — | — | — |
| Volatile expansion agent | Isopentane | 30 | 30 | 30 | 30 | 30 |

TABLE 5

| | | Example 1 | Example 2 | Example 3 | Example 4 | Example 5 | Example 6 | Example 7 |
|---|---|---|---|---|---|---|---|---|
| Gel fraction measurement | Gel fraction [x] at ordinary temperature | 45 | 68 | 52 | 49 | 51 | 18 | 21 |
| | Gel fraction [y] after heating at 180° C. for 30 min | 84 | 94 | 96 | 82 | 92 | 62 | 74 |
| | y/x | 1.87 | 1.38 | 1.85 | 1.67 | 1.80 | 3.44 | 3.52 |
| Degree of cross-linkage | Degree of cross-linkage (A) after heating at 140° C. for 30 min | 75 | 84 | 83 | 76 | 81 | 56 | 59 |
| | Degree of cross-linkage (B) after heating at 210° C. for 30 min | 98 | 96 | 97 | 88 | 94 | 86 | 93 |
| | (B/A) | 1.31 | 1.14 | 1.17 | 1.16 | 1.16 | 1.54 | 1.58 |
| Storage elastic modulus [Pa] | Storage elastic modulus (X) at 140° C. and 10 Hz | $8.85 \times 10^6$ | $1.23 \times 10^6$ | $1.38 \times 10^6$ | $9.26 \times 10^6$ | $8.49 \times 10^6$ | $4.58 \times 10^6$ | $4.53 \times 10^6$ |
| | Storage elastic modulus (Y) at 210° C. and 10 Hz | $7.26 \times 10^8$ | $8.39 \times 10^8$ | $1.18 \times 10^8$ | $7.58 \times 10^8$ | $1.06 \times 10^8$ | $4.88 \times 10^8$ | $5.46 \times 10^8$ |
| | (Y/X) | 82.0 | 682 | 855 | 81.9 | 125 | 107 | 121 |
| Maximum heat generation temperature in the temperature range of 140° C. to 210° C. | | 129 | 133 | 128 | 130 | 132 | 145 | 165 |
| Evaluation | Expansion ratio | Measured value | 5.2 | 5.3 | 3.4 | 4.7 | 4.5 | 6.3 | 7.2 |
| | | Evaluation | ∘∘ | ∘∘ | ∘ | ∘ | ∘ | ∘∘ | ∘∘ |
| | Heat resistance | Measured value | 2.8 | 2.8 | 2.2 | 2.9 | 2.4 | 3.9 | 4.8 |
| | | Evaluation | ∘ | ∘ | ∘ | ∘ | ∘ | ∘∘ | ∘∘∘ |
| | Durability | Measured value | 73 | 58 | 61 | 63 | 59 | 93 | 99 |
| | | Evaluation | ∘∘ | ∘ | ∘ | ∘ | ∘ | ∘∘∘ | ∘∘∘ |
| | Odor | Evaluation | ∘ | ∘ | ∘ | ∘ | ∘ | ∘ | ∘ |
| | Coloring | Evaluation | ∘∘∘ | ∘∘∘ | ∘∘ | ∘∘ | ∘∘ | ∘∘ | ∘∘∘ |
| | Appearance | Evaluation | ∘ | ∘ | ∘ | ∘ | ∘ | ∘ | ∘ |
| | Constant temperature retention at 200° C. over 30 min | Measured value | 28 | 32 | 25 | 31 | 25 | 85 | 87 |
| | | Evaluation | ∘ | ∘ | ∘ | ∘ | ∘ | ∘∘∘ | ∘∘∘ |
| | Compression resistance | Measured value | 39 | 42 | 65 | 71 | 59 | 31 | 11 |
| | | Evaluation | ∘∘ | ∘∘ | ∘ | ∘ | ∘ | ∘∘ | ∘∘∘ |
| | Cracking property | Measured value | 91 | 92 | 88 | 93 | 97 | 93 | 95 |
| | | Evaluation | ∘∘ | ∘∘ | ∘∘ | ∘∘ | ∘∘ | ∘∘ | ∘∘ |
| | Scale sticking | Evaluation | ∘ | ∘ | ∘ | ∘ | ∘ | ∘ | ∘ |

| | | Example 8 | Example 9 | Example 10 | Example 11 | Example 12 | Example 13 |
|---|---|---|---|---|---|---|---|
| Gel fraction measurement | Gel fraction [x] at ordinary temperature | 19 | 12 | 14 | 17 | 15 | 19 |
| | Gel fraction [y] after heating at 180° C. for 30 min | 87 | 60 | 57 | 55 | 56 | 54 |
| | y/x | 4.58 | 5.00 | 4.07 | 3.24 | 3.73 | 2.84 |

TABLE 5-continued

|  |  |  |  |  |  |  |  |
|---|---|---|---|---|---|---|---|
| Degree of cross-linkage | Degree of cross-linkage (A) after heating at 140° C. for 30 min | 59 | 39 | 33 | 57 | 29 | 33 |
|  | Degree of cross-linkage (B) after heating at 210° C. for 30 min | 91 | 66 | 69 | 76 | 62 | 75 |
|  | (B/A) | 1.54 | 1.69 | 2.09 | 1.33 | 2.14 | 2.27 |
| Storage elastic modulus [Pa] | Storage elastic modulus (X) at 140° C. and 10 Hz | $4.63 \times 10^6$ | $3.96 \times 10^6$ | $1.54 \times 10^6$ | $6.18 \times 10^6$ | $9.50 \times 10^5$ | $1.21 \times 10^6$ |
|  | Storage elastic modulus (Y) at 210° C. and 10 Hz | $4.86 \times 10^8$ | $4.72 \times 10^8$ | $4.88 \times 10^8$ | $2.29 \times 10^8$ | $1.18 \times 10^8$ | $6.82 \times 10^8$ |
|  | (Y/X) | 105 | 119 | 317 | 37.1 | 124 | 564 |
| Maximum heat generation temperature in the temperature range of 140° C. to 210° C. |  | 158 | 164 | 172 | 138 | 163 | 165 |
| Evaluation | Expansion ratio Measured value | 6.5 | 5.8 | 4.2 | 5.3 | 3.5 | 3.9 |
|  | Evaluation | ∘∘ | ∘∘ | ∘ | ∘∘ | ∘ | ∘ |
|  | Heat resistance Measured value | 4.8 | 2.6 | 3.4 | 4.7 | 2.6 | 2.7 |
|  | Evaluation | ∘∘∘ | ∘ | ∘∘ | ∘∘∘ | ∘ | ∘ |
|  | Durability Measured value | 99 | 59 | 76 | 86 | 61 | 64 |
|  | Evaluation | ∘∘∘ | ∘ | ∘∘ | ∘∘∘ | ∘ | ∘ |
|  | Odor Evaluation | ∘ | ∘ | ∘ | ∘ | ∘ | ∘ |
|  | Coloring Evaluation | ∘∘ | ∘∘ | ∘∘ | ∘∘ | ∘∘ | ∘∘ |
|  | Appearance Evaluation | ∘ | ∘ | ∘ | ∘ | ∘ | ∘ |
|  | Constant temperature retention at 200° C. over 30 min Measured value | 87 | 49 | 81 | 84 | 34 | 32 |
|  | Evaluation | ∘∘∘ | ∘∘ | ∘∘∘ | ∘∘∘ | ∘ | ∘ |
|  | Compression resistance Measured value | 23 | 24 | 55 | 61 | 69 | 62 |
|  | Evaluation | ∘∘ | ∘∘ | ∘ | ∘ | ∘ | ∘ |
|  | Cracking property Measured value | 95 | 93 | 94 | 91 | 93 | 94 |
|  | Evaluation | ∘∘ | ∘∘ | ∘∘ | ∘∘ | ∘∘ | ∘∘ |
|  | Scale sticking Evaluation | ∘ | ∘ | ∘ | ∘ | ∘ | ∘ |

TABLE 6

|  |  | Example 14 | Example 15 | Example 16 | Example 17 | Example 18 | Example 19 | Example 20 |
|---|---|---|---|---|---|---|---|---|
| Gel fraction measurement | Gel fraction [x] at ordinary temperature | 15 | 19 | 18 | 24 | 44 | 48 | 52 |
|  | Gel fraction [y] after heating at 180° C. for 30 min | 53 | 74 | 82 | 73 | 78 | 81 | 89 |
|  | y/x | 3.53 | 3.89 | 4.56 | 3.04 | 1.77 | 1.69 | 1.71 |
| Degree of cross-linkage | Degree of cross-linkage (A) after heating at 140° C. for 30 min | 32 | 45 | 62 | 41 | 55 | 73 | 74 |
|  | Degree of cross-linkage (B) after heating at 210° C. for 30 min | 75 | 80 | 87 | 82 | 89 | 97 | 97 |
|  | (B/A) | 2.34 | 1.78 | 1.40 | 2.00 | 1.62 | 1.33 | 1.31 |
| Storage elastic modulus [Pa] | Storage elastic modulus (X) at 140° C. and 10 Hz | $1.75 \times 10^6$ | $3.76 \times 10^6$ | $5.48 \times 10^6$ | $2.85 \times 10^6$ | $4.52 \times 10^6$ | $4.68 \times 10^6$ | $4.80 \times 10^6$ |
|  | Storage elastic modulus (Y) at 210° C. and 10 Hz | $1.53 \times 10^8$ | $4.29 \times 10^8$ | $4.96 \times 10^8$ | $2.68 \times 10^8$ | $5.48 \times 10^8$ | $5.22 \times 10^8$ | $5.16 \times 10^8$ |
|  | (Y/X) | 87.4 | 114 | 90.5 | 94.0 | 121 | 112 | 108 |
| Maximum heat generation temperature in the temperature range of 140° C. to 210° C. |  | 145 | 165 | 143 | 164 | 160 | 159 | 158 |
| Evaluation | Expansion ratio Measured value | 3.3 | 5.2 | 6.3 | 5.2 | 7.7 | 8.3 | 5.6 |
|  | Evaluation | ∘ | ∘∘ | ∘∘ | ∘∘ | ∘∘ | ∘∘ | ∘∘ |
|  | Heat resistance Measured value | 2.4 | 2.9 | 3.8 | 3.8 | 4.3 | 5.2 | 5.1 |
|  | Evaluation | ∘ | ∘ | ∘∘ | ∘∘ | ∘∘∘ | ∘∘∘ | ∘∘∘ |
|  | Durability Measured value | 52 | 64 | 78 | 59 | 88 | 99 | 99 |
|  | Evaluation | ∘ | ∘ | ∘∘ | ∘ | ∘∘∘ | ∘∘∘ | ∘∘∘ |
|  | Odor Evaluation | ∘ | ∘ | ∘ | ∘ | ∘ | ∘ | ∘ |
|  | Coloring Evaluation | ∘∘ | ∘∘ | ∘∘ | ∘∘ | ∘∘∘ | ∘∘ | ∘∘ |
|  | Appearance Evaluation | ∘ | ∘ | ∘ | ∘ | ∘ | ∘ | ∘ |
|  | Constant temperature retention at 200° C. over 30 min Measured value | 16 | 29 | 87 | 31 | 85 | 87 | 87 |
|  | Evaluation | ∘ | ∘ | ∘∘∘ | ∘ | ∘∘∘ | ∘∘∘ | ∘∘∘ |
|  | Compression resistance Measured value | 72 | 41 | 16 | 55 | 67 | 43 | 12 |
|  | Evaluation | ∘∘ | ∘∘ | ∘∘ | ∘ | ∘ | ∘∘ | ∘∘∘ |
|  | Cracking property Measured value | 96 | 95 | 95 | 93 | 86 | 92 | 99 |
|  | Evaluation | ∘∘ | ∘∘ | ∘∘ | ∘∘ | ∘∘ | ∘∘ | ∘∘ |
|  | Scale sticking Evaluation | ∘ | ∘ | ∘ | ∘ | ∘ | ∘ | ∘ |

|  |  | Example 21 | Example 22 | Example 23 | Example 24 | Example 25 | Example 26 |
|---|---|---|---|---|---|---|---|
| Gel fraction measurement | Gel fraction [x] at ordinary temperature | 48 | 3 | 4 | 2 | 2 | 1 |

TABLE 6-continued

|  |  |  |  |  |  |  |  |
|---|---|---|---|---|---|---|---|
|  |  | Gel fraction [y] after heating at 180° C. for 30 min | 86 | 71 | 76 | 71 | 74 | 81 |
|  |  | y/x | 1.79 | 23.7 | 19.0 | 35.5 | 37.0 | 81.0 |
|  | Degree of cross-linkage | Degree of cross-linkage (A) after heating at 140° C. for 30 min | 70 | 58 | 53 | 50 | 59 | 74 |
|  |  | Degree of cross-linkage (B) after heating at 210° C. for 30 min | 98 | 93 | 85 | 75 | 88 | 99 |
|  |  | (B/A) | 1.40 | 1.60 | 1.60 | 1.50 | 1.49 | 1.34 |
|  | Storage elastic modulus [Pa] | Storage elastic modulus (X) at 140° C. and 10 Hz | $4.68 \times 10^6$ | $6.82 \times 10^6$ | $6.53 \times 10^6$ | $6.34 \times 10^6$ | $7.02 \times 10^6$ | $4.53 \times 10^6$ |
|  |  | Storage elastic modulus (Y) at 210° C. and 10 Hz | $3.54 \times 10^8$ | $1.53 \times 10^8$ | $4.00 \times 10^8$ | $3.54 \times 10^8$ | $4.89 \times 10^8$ | $5.00 \times 10^8$ |
|  |  | (Y/X) | 75.6 | 22.4 | 61.3 | 55.8 | 70.0 | 110 |
|  | Maximum heat generation temperature in the temperature range of 140° C. to 210° C. |  | 153 | 172 | 170 | 168 | 164 | 198 |
| Evaluation | Expansion ratio | Measured value | 5.8 | 5.4 | 4.3 | 4.2 | 3.3 | 4.8 |
|  |  | Evaluation | ∘∘ | ∘∘ | ∘ | ∘ | ∘ | ∘ |
|  | Heat resistance | Measured value | 32 | 2.6 | 3.2 | 3.8 | 2.4 | 4.4 |
|  |  | Evaluation | ∘∘ | ∘ | ∘∘ | ∘∘ | ∘ | ∘∘∘ |
|  | Durability | Measured value | 58 | 59 | 69 | 66 | 86 | 90 |
|  |  | Evaluation | ∘ | ∘ | ∘∘ | ∘∘ | ∘∘∘ | ∘∘∘ |
|  | Odor | Evaluation | ∘ | ∘ | ∘ | ∘ | ∘ | ∘ |
|  | Coloring | Evaluation | ∘∘ | ∘∘ | ∘∘ | ∘∘ | ∘∘ | ∘∘ |
|  | Appearance | Evaluation | ∘ | ∘ | ∘ | ∘ | ∘ | ∘ |
|  | Constant temperature retention at 200° C. over 30 min | Measured value | 34 | 49 | 81 | 84 | 13 | 80 |
|  |  | Evaluation | ∘ | ∘∘ | ∘∘∘ | ∘∘∘ | ∘ | ∘∘∘ |
|  | Compression resistance | Measured value | 12 | 76 | 62 | 30 | 26 | 45 |
|  |  | Evaluation | ∘∘∘ | ∘ | ∘ | ∘∘ | ∘∘ | ∘∘ |
|  | Cracking property | Measured value | 98 | 94 | 97 | 92 | 90 | 88 |
|  |  | Evaluation | ∘∘ | ∘∘ | ∘∘ | ∘∘ | ∘∘ | ∘∘ |
|  | Scale sticking | Evaluation | ∘ | ∘ | ∘ | ∘ | ∘ | ∘ |

TABLE 7

|  |  | Comparative Example 1 | Comparative Example 2 | Comparative Example 3 | Comparative Example 4 | Comparative Example 5 | Comparative Example 6 |
|---|---|---|---|---|---|---|---|
| Gel fraction measurement | Gel fraction [x] at ordinary temperature | 70 | 75 | 75 | 12 | 13 | 18 |
|  | Gel fraction [y] after heating at 180° C. for 30 min | 72 | 76 | 80 | 13 | 18 | 17 |
|  | y/x | 1.03 | 1.01 | 1.07 | 1.08 | 1.38 | 0.94 |
| Degree of cross-linkage | Degree of cross-linkage (A) after heating at 140° C. for 30 min | 71 | 76 | 76 | 11 | 13 | 18 |
|  | Degree of cross-linkage (B) after heating at 210° C. for 30 min | 72 | 78 | 82 | 13 | 17 | 20 |
|  | (B/A) | 1.01 | 1.03 | 1.08 | 1.18 | 1.31 | 1.11 |
| Storage elastic modulus [Pa] | Storage elastic modulus (X) at 140° C. and 10 Hz | $8.36 \times 10^6$ | $1.93 \times 10^7$ | $2.38 \times 10^7$ | $5.84 \times 10^5$ | $9.88 \times 10^5$ | $1.22 \times 10^6$ |
|  | Storage elastic modulus (Y) at 210° C. and 10 Hz | $9.15 \times 10^6$ | $6.54 \times 10^7$ | $5.34 \times 10^7$ | $8.36 \times 10^3$ | $1.29 \times 10^3$ | $1.08 \times 10^3$ |
|  | (Y/X) | 1.09 | 3.39 | 2.24 | 0.014 | 0.001 | 0.0009 |
| Maximum heat generation temperature in the temperature range of 140° C. to 210° C. |  | No heat generation temperature | No heat generation temperature | No heat generation temperature | No heat generation temperature | No heat generation temperature | No heat generation temperature |
| Evaluation | Expansion ratio | Measured value | 4.7 | 3.5 | 4.3 | 2.2 | 2.3 | 1.0 |
|  |  | Evaluation | ∘ | ∘ | ∘ | x | x | x |
|  | Heat resistance | Measured value | 1.8 | 1.6 | 1.7 | 1.5 | 1.7 | 0.7 |
|  |  | Evaluation | x | x | x | x | x | x |
|  | Durability | Measured value | 35 | 29 | 33 | 27 | 27 | 24 |
|  |  | Evaluation | x | x | x | x | x | x |
|  | Odor | Evaluation | ∘ | x | x | ∘ | ∘ | ∘ |
|  | Coloring | Evaluation | ∘ | x | x | x | ∘∘ | ∘∘ |
|  | Appearance | Evaluation | ∘ | x | x | x | ∘ | ∘ |
|  | Constant temperature retention at 200° C. over 30 min | Measured value | 7.8 | 5.5 | 3.9 | 2.8 | 0.1 | 0.1 |
|  |  | Evaluation | x | x | x | x | x | x |

TABLE 7-continued

|  |  | | | | | | |
|---|---|---|---|---|---|---|---|
| Compression resistance | Measured value | 82 | 88 | 85 | 84 | 96 | 97 |
|  | Evaluation | x | x | x | x | x | x |
| Cracking property | Measured value | 88 | 92 | 93 | 87 | 68 | 76 |
|  | Evaluation | ∘∘ | ∘∘ | ∘∘ | ∘∘ | x | ∘ |
| Scale sticking | Evaluation | ∘ | x | x | ∘ | ∘ | ∘ |

|  |  |  | Comparative Example 7 | Comparative Example 8 | Comparative Example 9 | Comparative Example 10 | Comparative Example 11 |
|---|---|---|---|---|---|---|---|
| Gel fraction measurement | Gel fraction [x] at ordinary temperature | | 21 | 10 | 12 | 17 | 16 |
|  | Gel fraction [y] after heating at 180° C. for 30 min | | 22 | 9 | 13 | 10 | 13 |
|  | y/x | | 1.05 | 0.90 | 1.08 | 0.59 | 0.81 |
| Degree of cross-linkage | Degree of cross-linkage (A) after heating at 140° C. for 30 min | | 23 | 9 | 13 | 13 | 17 |
|  | Degree of cross-linkage (B) after heating at 210° C. for 30 min | | 20 | 9 | 10 | 19 | 20 |
|  | (B/A) | | 0.87 | 1.00 | 0.77 | 1.46 | 1.18 |
| Storage elastic modulus [Pa] | Storage elastic modulus (X) at 140° C. and 10 Hz | | $2.25 \times 10^6$ | $4.27 \times 10^5$ | $6.28 \times 10^5$ | $6.36 \times 10^5$ | $3.26 \times 10^5$ |
|  | Storage elastic modulus (Y) at 210° C. and 10 Hz | | $1.65 \times 10^3$ | $2.10 \times 10^3$ | $4.10 \times 10^3$ | $1.55 \times 10^3$ | $6.28 \times 10^3$ |
|  | (Y/X) | | 0.0007 | 0.005 | 0.007 | 0.002 | 0.019 |
| Maximum heat generation temperature in the temperature range of 140° C. to 210° C. | | | No heat generation temperature | No heat generation temperature | No heat generation temperature | No heat generation temperature | No heat generation temperature |
| Evaluation | Expansion ratio | Measured value | 1.1 | 1.2 | 1.1 | 1.4 | 2.5 |
|  |  | Evaluation | x | x | x | x | x |
|  | Heat resistance | Measured value | 0.4 | 0.6 | 0.6 | 1.3 | 2.3 |
|  |  | Evaluation | x | x | x | x | ∘ |
|  | Durability | Measured value | 25 | 27 | 26 | 22 | 38 |
|  |  | Evaluation | x | x | x | x | x |
|  | Odor | Evaluation | ∘ | ∘ | ∘ | x | x |
|  | Coloring | Evaluation | ∘∘ | ∘∘ | ∘∘ | x | x |
|  | Appearance | Evaluation | ∘ | ∘ | ∘ | x | x |
|  | Constant temperature retention at 200° C. over 30 min | Measured value | 0.3 | 0.2 | 0.2 | 0.3 | 0.6 |
|  |  | Evaluation | x | x | x | x | x |
|  | Compression resistance | Measured value | 95 | 98 | 99 | 92 | 94 |
|  |  | Evaluation | x | x | x | x | x |
|  | Cracking property | Measured value | 92 | 95 | 91 | 72 | 68 |
|  |  | Evaluation | ∘∘ | ∘∘ | ∘∘ | x | x |
|  | Scale sticking | Evaluation | ∘ | ∘ | ∘ | x | x |

TABLE 8

|  |  | Comparative Example 12 | Comparative Example 13 | Comparative Example 14 | Comparative Example 15 | Comparative Example 16 |
|---|---|---|---|---|---|---|
| Gel fraction measurement | Gel fraction [x] at ordinary temperature | 15 | 14 | 18 | 13 | 22 |
|  | Gel fraction [y] after heating at 180° C. for 30 min | 17 | 13 | 19 | 13 | 20 |
|  | y/x | 1.13 | 0.93 | 1.06 | 1.00 | 0.91 |
| Degree of cross-linkage | Degree of cross-linkage (A) after heating at 140° C. for 30 min | 16 | 15 | 19 | 13 | 21 |
|  | Degree of cross-linkage (B) after heating at 210° C. for 30 min | 17 | 15 | 21 | 18 | 25 |
|  | (B/A) | 1.06 | 1.00 | 1.11 | 1.38 | 1.19 |
| Storage elastic modulus [Pa] | Storage elastic modulus (X) at 140° C. and 10 Hz | $5.75 \times 10^5$ | $3.28 \times 10^5$ | $8.65 \times 10^5$ | $7.23 \times 10^5$ | $3.86 \times 10^6$ |

TABLE 8-continued

|  |  |  |  |  |  |  |  |
|---|---|---|---|---|---|---|---|
|  |  | Storage elastic modulus (Y) at 210° C. and 10 Hz | $4.65 \times 10^4$ | $7.96 \times 10^3$ | $8.13 \times 10^4$ | $2.68 \times 10^3$ | $2.75 \times 10^4$ |
|  |  | (Y/X) | 0.08 | 0.02 | 0.09 | 0.004 | 0.007 |
| Maximum heat generation temperature in the temperature range of 140° C. to 210° C. |  |  | No heat generation temperature | No heat generation temperature | No heat generation temperature | No heat generation temperature | No heat generation temperature |
| Evaluation | Expansion ratio | Measured value | 2.6 | 2.7 | 2.3 | 2.9 | 2.7 |
|  |  | Evaluation | x | x | x | x | x |
|  | Heat resistance | Measured value | 2.1 | 2.3 | 2.1 | 2.7 | 2.5 |
|  |  | Evaluation | ○ | ○ | ○ | ○ | ○ |
|  | Durability | Measured value | 26 | 26 | 29 | 24 | 29 |
|  |  | Evaluation | x | x | x | x | x |
|  | Odor | Evaluation | x | x | x | x | x |
|  | Coloring | Evaluation | x | x | x | x | x |
|  | Appearance | Evaluation | x | x | x | x | x |
|  | Constant temperature retention at 200° C. over 30 min | Measured value | 0.1 | 0.1 | 0.3 | 0.2 | 0.3 |
|  |  | Evaluation | x | x | x | x | x |
|  | Compression resistance | Measured value | 85 | 83 | 91 | 92 | 88 |
|  |  | Evaluation | x | x | x | x | x |
|  | Cracking property | Measured value | 74 | 64 | 65 | 64 | 54 |
|  |  | Evaluation | x | x | x | x | x |
|  | Scale sticking | Evaluation | x | x | x | x | x |

|  |  |  | Comparative Example 17 | Comparative Example 18 | Comparative Example 19 | Comparative Example 20 | Comparative Example 21 |
|---|---|---|---|---|---|---|---|
| Gel fraction measurement |  | Gel fraction [x] at ordinary temperature | 26 | 71 | 14 | 11 | 1 |
|  |  | Gel fraction [y] after heating at 180° C. for 30 min | 38 | 71 | 42 | 33 | 18 |
|  |  | y/x | 1.46 | 1.00 | 3.00 | 3.00 | 18.00 |
| Degree of cross-linkage |  | Degree of cross-linkage (A) after heating at 140° C. for 30 min | 60 | 72 | 16 | 10 | 12 |
|  |  | Degree of cross-linkage (B) after heating at 210° C. for 30 min | 66 | 70 | 96 | 95 | 96 |
|  |  | (B/A) | 1.10 | 0.97 | 6.00 | 9.50 | 8.00 |
| Storage elastic modulus [Pa] |  | Storage elastic modulus (X) at 140° C. and 10 Hz | $1.06 \times 10^7$ | $1.56 \times 10^7$ | $7.81 \times 10^6$ | $2.10 \times 10^7$ | $4.23 \times 10^6$ |
|  |  | Storage elastic modulus (Y) at 210° C. and 10 Hz | $5.60 \times 10^6$ | $8.94 \times 10^6$ | $6.59 \times 10^6$ | $8.92 \times 10^6$ | $6.75 \times 10^6$ |
|  |  | (Y/X) | 0.53 | 0.57 | 0.84 | 0.43 | 1.60 |
| Maximum heat generation temperature in the temperature range of 140° C. to 210° C. |  |  | No heat generation temperature | No heat generation temperature | No heat generation temperature | No heat generation temperature | No heat generation temperature |
| Evaluation | Expansion ratio | Measured value | 2.2 | 3.8 | 4.1 | 2.9 | 2.6 |
|  |  | Evaluation | x | ○ | ○ | x | x |
|  | Heat resistance | Measured value | 1.7 | 2.9 | 3.2 | 2.6 | 2.3 |
|  |  | Evaluation | x | ○ | ○○ | ○ | ○ |
|  | Durability | Measured value | 16 | 24 | 46 | 38 | 24 |
|  |  | Evaluation | x | x | x | x | x |
|  | Odor | Evaluation | ○ | ○ | x | x | x |
|  | Coloring | Evaluation | ○○ | ○○ | x | x | x |
|  | Appearance | Evaluation | x | ○ | x | x | x |
|  | Constant temperature retention at 200° C. over 30 min | Measured value | 0.1 | 0.6 | 0.8 | 0.6 | 0.1 |
|  |  | Evaluation | x | x | x | x | x |
|  | Compression resistance | Measured value | 99 | 90 | 91 | 96 | 99 |
|  |  | Evaluation | x | x | x | x | x |
|  | Cracking property | Measured value | 89 | 86 | 60 | 70 | 64 |
|  |  | Evaluation | ○○ | ○○ | x | x | x |
|  | Scale sticking | Evaluation | ○ | ○ | x | x | x |

INDUSTRIAL APPLICABILITY

The present invention can provide a thermally expandable microcapsule that exhibits a high expansion ratio and durability at high temperatures, and is not likely to cause coloring and odor when used for foam molding.

The invention claimed is:

1. A thermally expandable microcapsule comprising:
a shell formed from a polymer; and
a volatile expansion agent as a core agent encapsulated by the shell,
the shell obtained by polymerizing a monomer composition that contains a nitrile monomer and a compound having a glycidyl group in a molecule,
the shell exhibiting a value y of 50% or higher and a ratio y/x of 1.1 or higher, in which x represents a gel fraction at ordinary temperature, and y represents a gel fraction upon heating at 180° C. for 30 minutes,
wherein the shell is obtained by polymerizing a monomer composition that contains a nitrile monomer, a hydroxy group-containing monomer having a radical polymerizable double bond and a hydroxy group, and a polyfunctional reactive compound containing at least two glycidyl groups in one molecule and no radical polymerizable double bond.

2. A thermally expandable microcapsule comprising:
a shell formed from a polymer; and
a volatile expansion agent as a core agent encapsulated by the shell,
the shell obtained by polymerizing a monomer composition that contains a nitrile monomer and a compound having a glycidyl group in a molecule,
the shell exhibiting a value y of 50% or higher and a ratio y/x of 1.1 or higher, in which x represents a gel fraction at ordinary temperature, and y represents a gel fraction upon heating at 180° C. for 30 minutes,
wherein the shell is obtained by polymerizing a monomer composition that contains a nitrile monomer, an amide group-containing monomer, and a compound containing a glycidyl group in a molecule.

3. The thermally expandable microcapsule according to claim 1,
wherein the polymer constituting the shell has a degree (A) of cross-linkage upon heating at 140° C. for 30 minutes of 50% by weight or higher, a degree (B) of cross-linkage upon heating at 210° C. for 30 minutes of 75% by weight or higher, and a ratio (B/A) of (B) to (A) of 1.2 to 1.8.

4. The thermally expandable microcapsule according to claim 2,
wherein the polymer constituting the shell has a degree (A) of cross-linkage upon heating at 140° C. for 30 minutes of 50% by weight or higher, a degree (B) of cross-linkage upon heating at 210° C. for 30 minutes of 75% by weight or higher, and a ratio (B/A) of (B) to (A) of 1.2 to 1.8.

5. The thermally expandable microcapsule according to claim 1,
wherein the polymer constituting the shell has a storage elastic modulus (X) at 140° C. and 10 Hz of $1\times10^6$ to $1\times10^7$ Pa, the polymer constituting the shell has a storage elastic modulus (Y) at 210° C. and 10 Hz of $1\times10^8$ to $1\times10^9$ Pa, and the polymer has a ratio (Y/X) of (Y) to (X) of from 100 inclusive to 1000 inclusive.

6. The thermally expandable microcapsule according to claim 2,
wherein the polymer constituting the shell has a storage elastic modulus (X) at 140° C. and 10 Hz of $1\times10^6$ to $1\times10^7$ Pa, the polymer constituting the shell has a storage elastic modulus (Y) at 210° C. and 10 Hz of $1\times10^8$ to $1\times10^9$ Pa, and the polymer has a ratio (Y/X) of (Y) to (X) of from 100 inclusive to 1000 inclusive.

7. The thermally expandable microcapsule according to claim 3,
wherein the polymer constituting the shell has a storage elastic modulus (X) at 140° C. and 10 Hz of $1\times10^6$ to $1\times10^7$ Pa, the polymer constituting the shell has a storage elastic modulus (Y) at 210° C. and 10 Hz of $1\times10^8$ to $1\times10^9$ Pa, and the polymer has a ratio (Y/X) of (Y) to (X) of from 100 inclusive to 1000 inclusive.

8. The thermally expandable microcapsule according to claim 4,
wherein the polymer constituting the shell has a storage elastic modulus (X) at 140° C. and 10 Hz of $1\times10^6$ to $1\times10^7$ Pa, the polymer constituting the shell has a storage elastic modulus (Y) at 210° C. and 10 Hz of $1\times10^8$ to $1\times10^9$ Pa, and the polymer has a ratio (Y/X) of (Y) to (X) of from 100 inclusive to 1000 inclusive.

9. The thermally expandable microcapsule according to claim 1,
wherein an amount of the polyfunctional reactive compound is 0.1 to 20% by weight of the whole monomer composition.

10. The thermally expandable microcapsule according to claim 2,
wherein the amide group-containing monomer is acrylamide or methacrylamide.

11. The thermally expandable microcapsule according to claim 1,
wherein the monomer composition has a content ratio (amide group-containing monomer/compound containing a glycidyl group in a molecule) of the amide group-containing monomer to the compound containing a glycidyl group in a molecule of 1.5 to 12.

12. The thermally expandable microcapsule according to claim 10,
wherein the monomer composition has a content ratio (amide group-containing monomer/compound containing a glycidyl group in a molecule) of the amide group-containing monomer to the compound containing a glycidyl group in a molecule of 1.5 to 12.

* * * * *